US011199697B2

(12) United States Patent
Gao et al.

(10) Patent No.: US 11,199,697 B2
(45) Date of Patent: Dec. 14, 2021

(54) SCANNING PROJECTOR WITH MULTIPATH BEAM RELAY

(71) Applicant: Facebook Technologies, LLC, Menlo Park, CA (US)

(72) Inventors: Weichuan Gao, Redmoond, WA (US); Brian Wheelwright, Sammamish, WA (US); Maxwell Parsons, Berkley, CA (US); Daniel Guenther Greif, Redmond, WA (US); Scott Charles McEldowney, Redmond, WA (US)

(73) Assignee: FACEBOOK TECHNOLOGIES, LLC, Menlo Park, CA (US)

(*) Notice: Subject to any disclaimer, the term of this patent is extended or adjusted under 35 U.S.C. 154(b) by 259 days.

(21) Appl. No.: 16/597,309

(22) Filed: Oct. 9, 2019

(65) Prior Publication Data
US 2021/0109343 A1 Apr. 15, 2021

(51) Int. Cl.
G02B 26/08 (2006.01)
G02B 26/10 (2006.01)
G02B 27/00 (2006.01)
G02B 27/28 (2006.01)

(52) U.S. Cl.
CPC ....... *G02B 26/101* (2013.01); *G02B 26/0833* (2013.01); *G02B 27/0081* (2013.01); *G02B 27/283* (2013.01)

(58) Field of Classification Search
CPC ............. G02B 26/101; G02B 26/0833; G02B 27/0081; G02B 27/283; G02B 5/30; G02B 27/0172; G02B 2027/0178; G02B 2027/0123

USPC ....................................................... 359/201.2
See application file for complete search history.

(56) References Cited

U.S. PATENT DOCUMENTS

| 6,700,552 | B2 | 3/2004 | Kollin et al. |
| 8,274,720 | B2 | 9/2012 | Kessler |
| 8,531,750 | B2* | 9/2013 | Kessler ............. G02B 17/0615 359/202.1 |
| 10,056,020 | B2 | 8/2018 | Chi et al. |
| 10,168,537 | B1 | 1/2019 | Parsons |
| 2018/0052325 | A1 | 2/2018 | Bohn |
| 2018/0120559 | A1 | 5/2018 | Yeoh et al. |
| 2018/0172995 | A1 | 6/2018 | Lee et al. |

(Continued)

FOREIGN PATENT DOCUMENTS

JP 2010181734 8/2010

OTHER PUBLICATIONS

PCT/US2020/049617 dated Nov. 4, 2020.

*Primary Examiner* — Euncha P Cherry
(74) *Attorney, Agent, or Firm* — Pequignot + Myers; Matthew A. Pequignot

(57) ABSTRACT

A scanning projector for a display apparatus includes a first scanning reflector configured to steer a light beam in a first plane, a second scanning reflector configured to steer the light beam received from the first scanning reflector in a second plane, and beam relay optics configured to relay a first pupil defined at the first scanning reflector to a second pupil defined at the second scanning reflector, and to relay the second pupil to an output pupil of the scanning projector. The beam relay optics may include a concave reflector and a polarization beam splitter coupled to a scanning reflector in a triple pass configuration.

20 Claims, 13 Drawing Sheets

(56) References Cited

U.S. PATENT DOCUMENTS

2019/0171020 A1   6/2019  Robbins et al.
2019/0278076 A1*  9/2019  Chen .................... G02B 26/101

* cited by examiner

SCANNING PROJECTOR WITH MULTIPATH BEAM RELAY

TECHNICAL FIELD

The present disclosure relates to optical scanners and in particular to scanning projectors for near-eye displays.

BACKGROUND

Head mounted displays (HMD), helmet mounted displays, near-eye displays (NED), and the like are being used increasingly for displaying virtual reality (VR) content, augmented reality (AR) content, mixed reality (MR) content, and they are finding applications in diverse fields including entertainment, education, training and biomedical science, to name just a few examples. The VR/AR/MR content can be three-dimensional (3D) to enhance the experience and to match virtual objects to real objects observed by the user. Eye position and gaze direction, and/or orientation of the user may be tracked in real time, and the displayed imagery may be dynamically adjusted depending on the user's head orientation and gaze direction, to provide a better experience of immersion into a simulated or augmented environment.

Compact display devices are desired for head-mounted displays. Because a display of HMD or NED is usually worn on the head of a user, a large, bulky, unbalanced, and/or heavy display device would be cumbersome and may be uncomfortable for the user to wear.

Scanning projector displays provide images in angular domain, which can be observed by an eye directly, without an intermediate screen or a display panel. The lack of a screen or a display panel in a scanning projector display enables size and weight reduction of the display. Compact and efficient scanners such as tiltable MEMS reflectors may be used to provide a miniature scanning projector suitable for use in a NED and NED-like displays.

BRIEF DESCRIPTION OF THE DRAWINGS

Exemplary embodiments will now be described in conjunction with the drawings, in which like elements are indicated with like reference numerals, which are not to scale, and in which.

DETAILED DESCRIPTION

Figure 1:
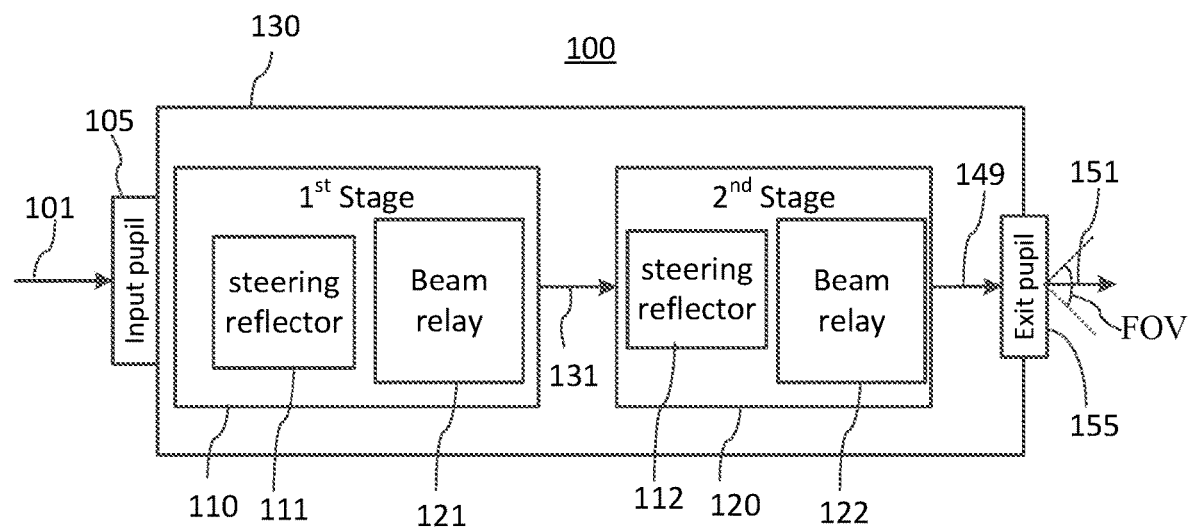
FIG. 1 is a schematic block diagram of a two-stage image projector having two beam steering reflectors coupled in series.

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated.

The terms "pupil relay", "pupil relay system", "pupil relay optics", and the like relate to an optical system that defines one or more optical paths between a first pupil and a second pupil, and which transfers a beam incident at a first pupil to a second pupil located at some distance away from the first pupil. In a pupil relay as understood herein, light beams emanating from the first pupil at different angles substantially overlap at the second pupil. Thus, a pupil relay operating with scanned beams transfers a variable beam angle at the first pupil to a variable beam angle at the second pupil, substantially without lateral shifts in the beam position at the second pupil. Here substantially means with some tolerance that may be related to various inaccuracies in the optical system and components thereof, and may mean for example within +\-10% of the diameter of the light beam at the second pupil, and preferably within +/−5% of the diameter of the light beam at the second pupil, depending on system design and tolerances. The tolerance to lateral displacement may depend on the energy profile of the beam. For example, a Gaussian beam profile truncated at the $1/e^2$ beam diameter may be more tolerant to pupil relay lateral shifts than a flat "top hat" distribution of the beam energy along the same diameter. The first and second pupils may be defined by optical components of the system in which the pupil relay is used, such as reflectors and lenses. The term "pupil relay magnification" refers to an increase in size of the beam from the first to the second pupil. A pupil relay may image the first pupil onto the second pupil.

The term "field of view" (FOV), when used in relation to an optical system, may define an angular range of beam propagation supported by the system. A FOV may be defined by angular ranges in two orthogonal planes coplanar with an optical axis or a portion thereof. For example, a FOV of a NED device may be defined by a vertical FOV, for example +\−20° relative to a horizontal plane, and a horizontal FOV, for example +\−30° relative to the vertical plane. With respect to a FOV of a NED, the "vertical" and "horizontal" planes or directions may be defined relative to the head of a standing person wearing the NED. Otherwise the terms "vertical" and "horizontal" may be used in the present specification with reference to two orthogonal planes of an optical system or device being described, without implying any particular relationship to the environment in which the optical system or device is used, or any particular orientation thereof to the environment. The terms "NED" and "HMD" may be used herein interchangeably.

An aspect of the present disclosure relates to a 2D scanning projector comprising: a first scanning stage comprising a first scanning reflector configured to steer an input light beam in a first plane; a second scanning stage comprising a second scanning reflector configured to steer the input light beam received from the first scanning stage in a second plane; and, beam relay optics configured to relay a first pupil defined at the first scanning reflector to a second pupil defined at the second scanning reflector, and to relay the second pupil to an output pupil of the scanning projector.

An aspect of the present disclosure relates to a system and method for scanning a beam of light in two dimensions using two or more sequentially disposed 1D or 2D scanning reflectors.

An aspect of the present disclosure provides a scanning projector for a display apparatus, comprising: a first scanning reflector configured to steer a light beam in at least a first plane; a second scanning reflector configured to steer the light beam received from the first scanning reflector in at least a second plane; and, beam relay optics configured to relay a first pupil defined at the first scanning reflector to a second pupil defined at the second scanning reflector, and to relay the second pupil to an output pupil of the scanning projector. In some implementations the second scanning reflector is configured so that the second plane is generally orthogonal to the first plane.

In some implementations the beam relay optics comprises a first polarization beam splitter (PBS) and a first concave reflector coupled to the first PBS, wherein the first PBS is disposed in a triple-pass configuration for routing the light beam sequentially to the first scanning reflector and to the first concave reflector in a first two passes, and toward the second scanning reflector in a third pass.

In some implementations the scanning projector comprising a waveplate disposed in an optical path of the light beam for converting a polarization state thereof to an orthogonal polarization state between consecutive passes through the first PBS.

In some implementations a lens may be disposed in an optical path of the light beam upstream of the first scanning reflector. In some implementations the lens may comprise an output lens disposed at the output pupil.

In some implementations the first PBS may be disposed to direct the light beam sequentially to the first scanning reflector in the first pass and to the first concave reflector in the second pass. The beam relay optics may further comprise a second PBS and a second concave reflector coupled to the second PBS. The second PBS may be disposed in a triple-pass configuration to direct the light beam received from the first PBS sequentially toward the second scanning reflector and toward the second concave reflector in a first two passes through the second PBS, and toward the output pupil in a third pass.

In some implementations the beam relay optics may further comprise four quarter-wave plates (QWP), one QWP proximate to each of the first scanning reflector, the second scanning reflector, the first concave reflector, and the second concave reflector, for converting a polarization of the light beam between consecutive passes through each of the first and second PBS.

In some implementations the first PBS may be disposed to direct the light beam reflected from the first scanning reflector toward the first concave reflector, and from the first concave reflector toward the second PBS. In some implementations a first focusing lens may be disposed upstream from the first PBS, and an output focusing or collimating lens may be disposed at the output pupil of the scanning projector. In some implementations the first focusing lens may be configured to cooperate with the first concave reflector to converge the light beam to a focus at an intermediate location in an optical path between the first and second scanning reflectors. In some implementations a second focusing lens may be disposed proximate to the second scanning reflector. In some implementations the first concave reflector and the second focusing lens cooperate to relay the first pupil to the second pupil with a magnification. In some implementations the second scanning reflector may be greater in area than the first scanning reflector.

In some implementations each of the first and second scanning reflectors comprises a tiltable MEMS reflector.

An aspect of the present disclosure provides a method for forming an image, the method comprising: providing a light beam to a first scanning reflector; responsive to a first image signal, steering the light beam in a first plane with the first scanning reflector; relaying the light beam from the first scanning reflector onto a second scanning reflector; responsive to a first image signal, steering the light beam with the second scanning reflector in a second plane; and, relaying the light beam from the second scanning reflector to an output pupil at an angle defined by steering angles of the first and second scanning reflectors and substantially without an angle-dependent lateral spatial shift. The relaying the light beam from the first scanning reflector onto a second scanning reflector or from the second scanning reflector to the output pupil may comprise using a first concave reflector and a first PBS in a triple-pass configuration.

In some implementations the method may comprise using the first PBS and the first concave reflector to direct the light beam from the first scanning reflector to the second scanning reflector, and using a second PBS coupled to a second concave reflector to direct the light beam from the first PBS sequentially toward the second scanning reflector and the output pupil.

In some implementations the method may comprise changing a polarization state of the light beam to an orthogonal polarization state between consecutive passes through each of the first and second PBS.

An aspect of the present disclosure provides a near-eye display (NED) device comprising: a support structure for wearing on a user's head; a light source carried by the support structure for providing a light beam; a pupil expander carried by the support structure; and, a scanning projector carried by the support structure. The scanning projector may comprise a first scanning reflector configured to steer the light beam in at least a first plane, a second scanning reflector configured to steer the light beam received from the first scanning reflector in at least a second plane, and beam relay optics configured to relay a first pupil defined at the first scanning reflector to a second pupil defined at the second scanning reflector, and to relay the second pupil to an output pupil of the scanning projector. The pupil expander may be configured to expand the output pupil of the scanning projector in size for directing the light beam toward an eye of the user.

In some implementations the beam relay optics comprises a concave reflector, and a polarization beam splitter (PBS) that is disposed in a triple-pass configuration and is coupled to the concave reflector.

In some implementations one of the first and second scanning reflectors may be operable to scan light in two dimensions to form a two-dimensional (2D) image in a field of view (FOV) defined in an angle space, and the other of the two scanning reflectors may be operable to shift the 2D image in the angle space in response to a control signal.

Referring to FIG. 1, a two-stage scanning projector 100, also referred to as projector 100, is configured to receive an input light beam 101, and scan it angularly in two dimensions (2D). The input light beam is scanned using two successive beam scanning stages, a first scanning stage 110 and a second scanning stage 120, to produce an output light beam 151. The output light beam 151 may be scanned across a particular FOV, generally in 2D. In some embodiments, for example when projector 100 is used in a display device, the input light beam 101 may be temporally modulated in coordination with the scanning, so that the output light beam 151 at the output of projector 100 renders a 2D image in an angle space, which may be converted to a spatial image by an observer's eye or by a focusing lens for displaying on a screen.

In some embodiments each of the first and second scanning stages 110, 120 may be configured to scan a light beam it receives angularly in a particular plane, and may be referred as a 1D scanning stage. In example embodiments described hereinafter, the first scanning stage 110 includes a first scanning reflector (SR) 111 configured to steer an input light beam in a first plane, while the second scanning stage 120 includes a second SR 112 configured to steer the input light beam received from the first scanning stage 110 in a second plane. Each of the SRs 111 and 112 may include, for example, a tiltable mirror or more generally a tiltable reflector (TR). However, embodiments using light steering devices other than tiltable reflectors may also be envisioned, such as those based on controllable refraction and/or diffraction of incident light. In at least some example embodiments described below the planes in which the first and second SRs 111, 112 steer the input light beam are substantially orthogonal, which simplifies scanning the output light beam 151 in a raster scanning pattern. Here "substantially" means with certain accuracy, for example +\−1°, or +\−3°, depending on system design and tolerances. It will be appreciated however that scanning the input beam sequentially in two planes that are neither orthogonal nor parallel can also be used to produce a 2D scanning pattern. Non-parallel planes may mean for example planes that are oriented at an angle of at least 30° relative to each other. Embodiments in which the SRs 111, 112 steer their respective input beams in a same plane could also be envisioned, for example to scan the output scanning light beam 151 in a wider angular range that may be supported by either of the SRs 111 or 112, or to provide coarse and fine scanning separately.

Projector 100 may further include beam relay optics 121, 122 that relay the input beam from the first SR 111 to the second SR 112, and from the second SR 112 to an output pupil 155 of the scanning projector 100. In the embodiment illustrated in FIG. 1, this beam relay optics is represented by a first beam relay 121 and a second beam relay 122. The first beam relay 121 and the second beam relay 122 may be considered as parts of the respective first and second scanning stages 110 and 120 as shown, but may also be coupled thereto, and/or may share with them one or more optical components. The first beam relay 121 may include refractive and/or reflective optics that relays the beam reflected from the first SR 111 to the second SR 112, while the second beam relay 122 may include refractive and/or reflective optics that relays the beam reflected from the $2^{nd}$ SR 111 to output pupil. The first beam relay 121 and the second beam relay 122 may share one or more optical components, such as a lens in front of the second SR 112 that is double-passed as described below with reference to one or more example embodiments. The optics of the first beam relay 121 and the second beam relay 122 may function as a pupil relay, relaying a first pupil defined at the first SR 111 to a second pupil defined at the second SR 112, and to relay the second pupil to an output pupil 155 of the scanning projector. The output pupil 155 may be defined, for example, by an output focusing or collimating lens, as described below.

Figure 2:
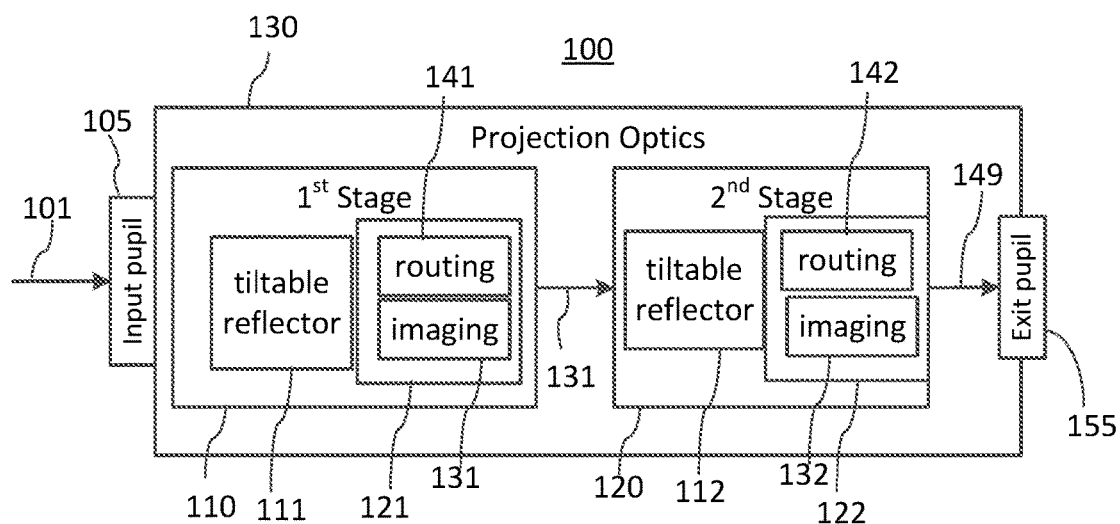
FIG. 2 is a schematic block diagram of an embodiment of the image projector of FIG. 1 with beam routing optics in each of the two scanning stages.

With reference to FIG. 2, there is illustrated an embodiment of projector 100 in which the first beam relay 121 includes first imaging optics 131 and first routing optics 141, while the second beam relay 122 includes second imaging optics 132 and second routing optics 142. Elements that are indicated in FIG. 2 with the same reference as in FIG. 1 perform in the embodiment of FIG. 2 the same function as in the embodiment of FIG. 1, and may not be described again. Imaging optics 131 and 132 may include one or more refractive and/or reflective optical elements having optical power. In some embodiments, imaging optics 131 may be configured to image a reflective surface of SR 111, or an operating portion thereof, onto a reflective surface of SR 112, or an operating portion thereof, so that the beam scanned by SR 111 impinges upon generally a same area of the second SR 112 for a range of scanning angles of SR 111. In some embodiments, imaging optics 132 may be configured to image a reflective surface of SR 112, or an operating portion thereof, onto the output pupil 155, so that beam 149 incident upon the output pupil 155 impinges upon generally a same area thereof for a range of the scanning angles provided by the first and second SRs 111, 112. The routing optics 141 and 141 may include one or more optical elements that may be without optical power but are configured to rout beams incident thereon in desired directions. The first routing optics 141 may rout the input optical beam from the first SR 111 to the second SR 112, such as through, or engaging, one or more optical elements of the first imaging optics 131. The second routing optics 142 may rout the input optical beam from the second SR 112 to the output pupil 155, such as through, or engaging, one or more optical elements of the second imaging optics 132. In some embodiments the routing optics 141 and 142 may fold the optical path of the input beam to decrease the projector footprint, and may provide polarization-assisted multi-pass routing.

Figure 3:
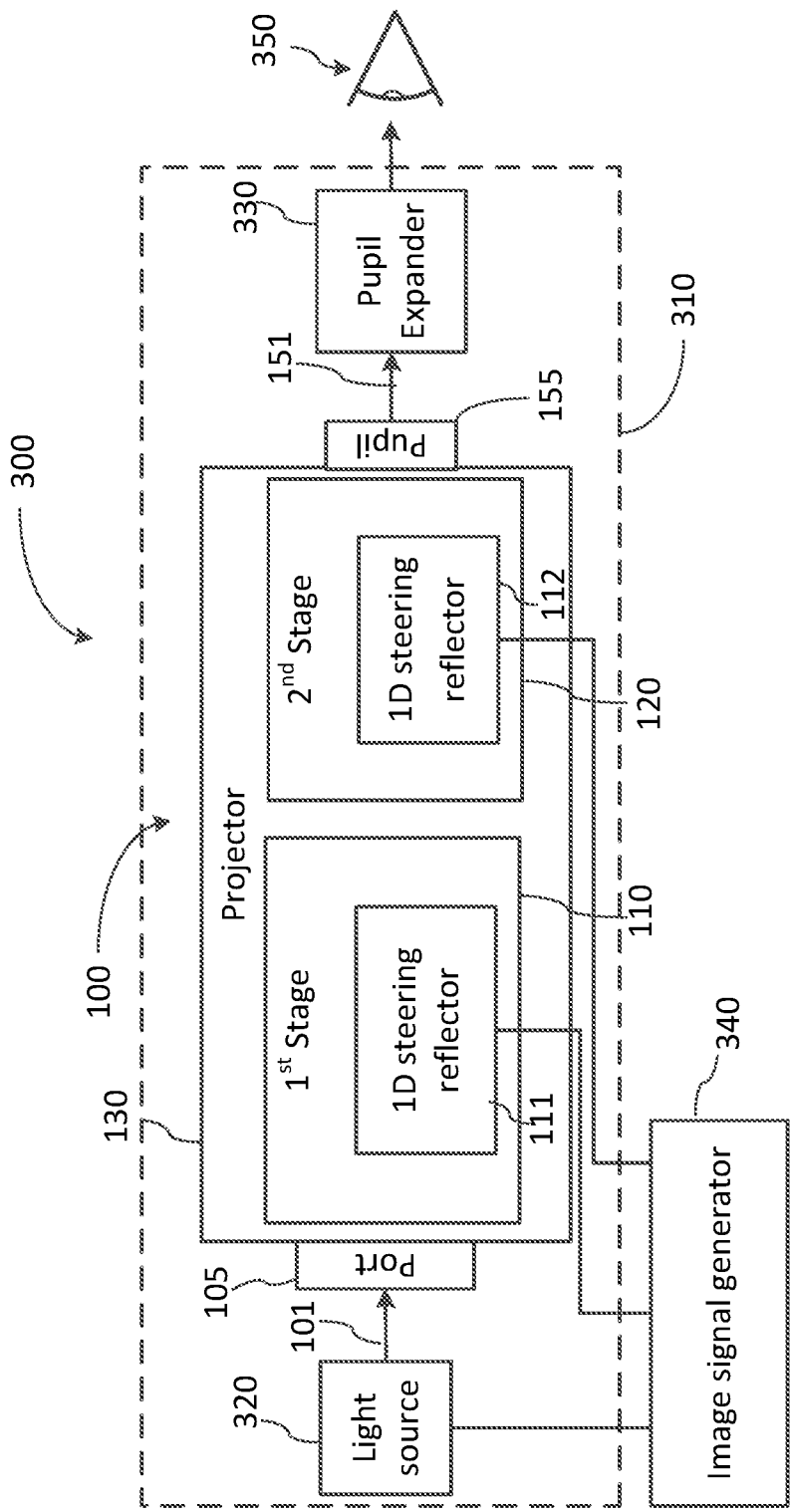
FIG. 3 is a schematic block diagram of a near-eye display (NED) using the image projector of FIG. 1.

Referring to FIG. 3, there is schematically illustrated a display device 300 using an embodiment of projector 100 to generate image light. Elements that are indicated in FIG. 3 with the same reference numerals as in FIG. 1 and FIG. 2 perform in the embodiment of FIG. 3 the same function as in the embodiments of FIGS. 1 and 2, and may not be described here again. As illustrated, the display device 300 may be an NED which provides angularly scanned image light to an eye 350 of the user. A support structure 310, such as a monocular or binocular frame, may be configured for wearing on the head of a user. The support structure 310 may carry a light source 320, projector 100, and a pupil expander 330. In binocular implementation, the support structure 310 may carry two instances or these devices, one for each eye 350 of the user. In other embodiments the display device 300 may be configured to project the angularly scanned image light onto a screen. In some embodiments the pupil expander 330 may be absent or may be replaced with an objective or suitable projecting optics configured to form a spatial image on a screen. When implemented as a NED, the display device 300 may be configured to form virtual images. The light source 320 carried by the frame 310 provides the input beam 101 to projector 100, also carried by the frame 310. The pupil expander 330 expands the output pupil 155 of projector 100 in area for presenting to the user's eye 350. The light source 310 may be configured to modulate the input light in time and spectrum to transmit images, and may be coupled to an image generating processor 340 that provides corresponding timing and color selection signals to the light source 320. In RGB displays the light source 320 may include, for example, sources of red, green, and blue light, such as red, green, and blue laser diodes (LDs) or light emitting diodes (LEDs), which light may be separately modulated in accordance with signals from processor 340, and optically multiplexed to produce the input light beam 101. From the light source 320, the input light 101 may be delivered to projector 100 using, for example, a suitable optical waveguide such as an optical fiber, or bulk optical components, or in free space. Projector 100 scans the modulated input light beam 101 to produce the output light 151 beam that is 2D-scanned in the angle space within some 2D FOV, as defined by angle scanning ranges of the SRs 111 and 112 and, possibly, aperture limitations of the beam routing optics of the projector 100. The pupil expander 330 may then be used to expand the output pupil 155 of the projector for the viewer. The pupil expander 330 may be for example in the form of an optical waveguide with an input and output couplers, with the output couplers generally being greater in area that the input coupler or couplers. In one embodiment, the pupil expander 330 is an optical waveguide having one or more input grating as an input coupler and one or more output gratings as the output coupler, with the gratings configured to match the FOV of projector 100 to a range of angles of total internal reflection (TIR) provided by the waveguide. Although FIG. 3 shows a single projector 100 coupled to a single optical source 320 at its input and a single pupil expander at its output, it will be appreciated that in binocular NEDs a separate projector 100 coupled to its own light source 320 and its own pupil expander 330 may be used for each eye of the user.

The beam relay optics of a scanning projector according to some embodiments of the present disclosure may include, in addition to first and second SRs, a curved reflector, such as a concave mirror, which may cooperate with other optical elements of the projector to provide pupil relay, and at least one polarization beam splitter (PBS) to implement polarization controlled multi-pass beam routing. In some embodiments the PBS may be disposed in a triple-pass configuration to sequentially direct the input light beam toward a selected SR and a concave reflector in a first two passes, and to direct the beam reflected from the concave mirror or the SR toward either the second scanning stage or toward an output pupil in a third pass.

Figure 4A:
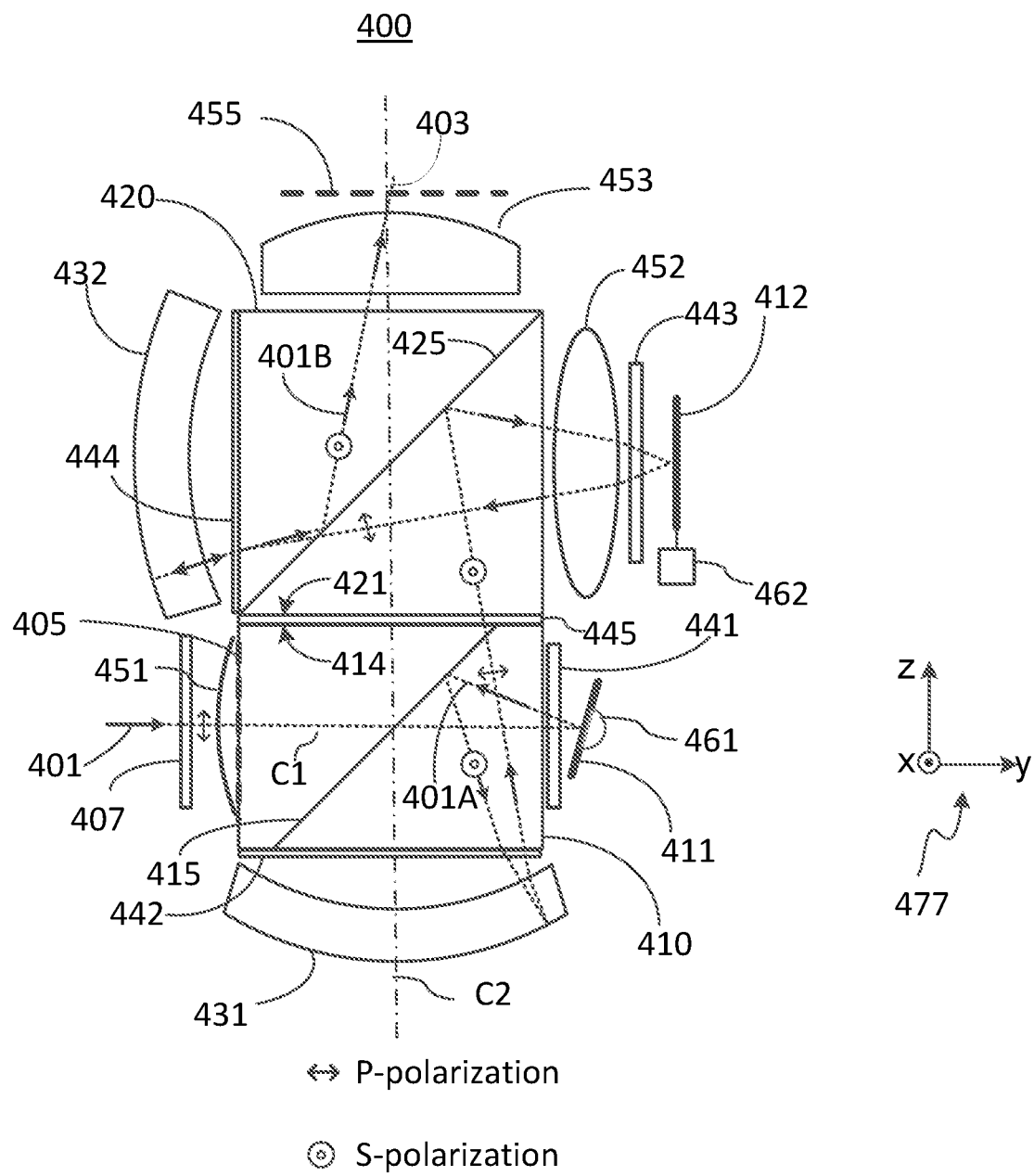
FIG. 4A is a schematic side cross-sectional view of an example implementation of a two-stage image projector with a tiltable reflector and polarization-controlled beam relay at each scanning stage.
Figure 4B:
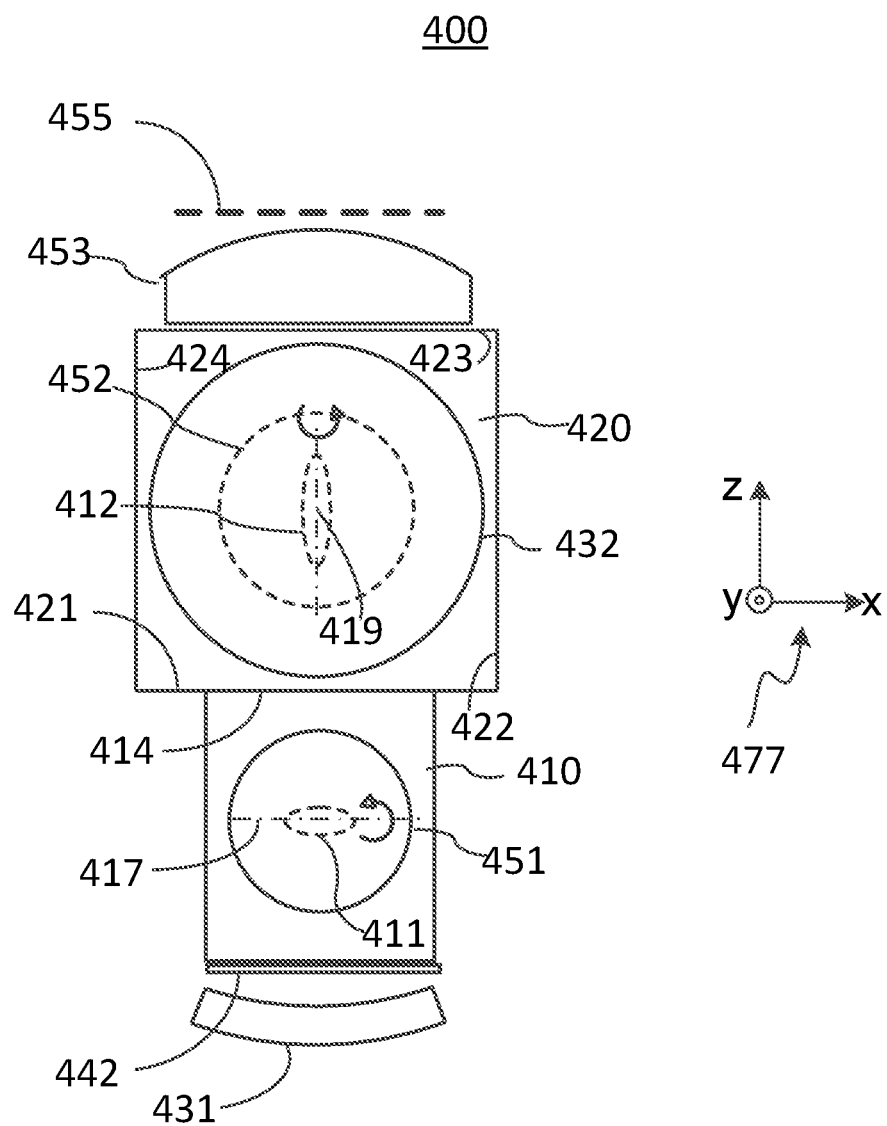
FIG. 4B is a schematic front view of the example image projector of FIG. 4A.

Referring now to FIGS. 4A and 4B, there is illustrated an example scanning projector 400 that may be viewed as an embodiment of the two-stage scanning projector 100 generally described above. The scanning projector 400, which may be referred hereinafter simply as projector 400, implements, among other features, polarization-assisted multi-pass beam routing, providing two-stage pupil relay in a compact footprint. FIG. 4A illustrates a cross-section of projector 400 in a plane of incidence of an input beam 401 upon an input pupil 405 of the projector, while FIG. 4B illustrates projector 400 in projection on a plane orthogonal to the plane of incidence. In the following description a Cartesian coordinate system (x,y,z) 477 may be used, in which the input light beam 401 is incident upon the projector in the direction of the y-axis, and the two scanning stages of the projector are aligned generally in the z-axis direction. In the following description the input light beam 401, as it traverses projector 400, may be referred to as the input beam 401, or as beam 401, or simply as "the beam". Similarly to the projector 100 as generally described above, the input light beam 401 is passed through the two scanning stages in sequence, emerging from an output pupil 455 of the projector in the form of an output beam 403. The first scanning stage includes a first SR 411, while the second scanning stage includes a second SR 412. The output beam 403, which may be scanned with SRs 411 and 412 in sequence to produce an image, may also be referred to as the image beam 403. In the illustrated embodiment the first SR 411 is operable to steer the beam in a first plane, while the second SR 412 is operable to steer the beam in a second plane that may differ from the first plane. In the illustrated example the first plane may be the plane of the figure, which is also the (z,y) plane of the Cartesian coordinate system 477, while the second plane is generally orthogonal to the first plane, and may be described as an (x,y) plane of the coordinate system 477. The first SR 411 may be a tiltable reflector (TR), such as a tiltable mirror, controlled by a first actuator 461 to tilt it about an axis 417 parallel to the x-axis. The second SR 412 may also be a TR controlled by a second actuator 462 to tilt it about an axis 419 parallel to the z-axis. In other embodiments the tilt axes of SRs 411, 412 may have other relative orientations.

In the illustrated embodiment the routing optics of projector 400 includes a PBS in each of its two scanning stages, a first PBS 410 with a polarization routing surface 415 in the first scanning stage, and a second PBS 420 with a polarization routing surface 425 in the second scanning stage. The PBS 410, 420 may be in the form of, or include, PBS cubes or prisms, but may also be embodied using other types of polarizers, for example using wire grid polarizers as the polarization routing surfaces 415, 425. The input pupil 405 may be defined by an optional input lens 451. Input lens 451 may be disposed at an input of a first scanning stage of the projector, such as at an input face or side of the first PBS 410. The beam relay of the projector may be formed with two curved reflectors, a first concave reflector 431 optically coupled to the first SR 411 via PBS 410, and a second concave reflector 432 optically coupled to SR 412 via PBS 420. The concave reflectors 431, 432 may be each in the form of a concave mirror configured to fully, or at least partially, reflect incident light. At the first scanning stage, the first PBS 410 is disposed in a triple-pass configuration to direct the input light beam 401 toward the second scanning stage after sequential reflections from the first SR 411 and the first concave reflector 431. At the second scanning stage, the second PBS 420 is disposed to receive the beam from the first scanning stage. The second PBS 420 is optically coupled to the second SR 412 and the second concave reflector 432 in a triple-pass configuration to direct the beam received from the first scanning stage, toward the output pupil 455 after consecutive reflections from the second SR 413 and the second concave reflector 432. In the context of the present disclosure, "direct the beam" may include allowing the beam to propagate therethrough without a change of direction.

In order to provide the desired beam routing by the respective PBS 410 or 420, one or more polarization converters, such as one or more waveplates, may be provided to convert the beam to an orthogonal polarization between consecutive passes through each of the PBS. In the illustrated embodiment, a quarter-wave plate (QWP) may be provided proximate to each of the reflectors 411, 412, 431 and 432, so as to be passed by the beam both on the way to and from a respective reflector, thereby changing the polarization of the beam to an orthogonal polarization at each consecutive entrance of the PBS 410 or PBS 420. More particularly, a first QWP 441 may be provided in the optical path between PBS 410 and SR 411, a second QWP 442 may be provided in the optical path between PBS 410 and concave reflector 431, a third QWP 443 may be provided in the optical path between PBS 420 and SR 412, and a fourth QWP 444 may be provided in the optical path between PBS 420 and concave reflector 432. In some embodiments QWPs 442 and 444 may be laminated onto respective PBS faces. In some embodiments QWPs 442 and 444 may be laminated on the respective concave mirrors.

The beam routing in projector 400 may be understood by considering the propagation of the input beam 401, which is illustrated in the figure by its central ray shown with a dotted line. The input beam 401 enters the first stage of the projector through an input pupil 405 as polarized light of a first polarization state, which may be denoted as LP1. A polarization state orthogonal to LP1 may be denoted as LP2. In some embodiments, the polarization state LP1 may correspond to a linear p-polarization, as defined relative to its incidence upon the first polarization routing surface 415, with the LP2 corresponding to the linear s-polarization. In some embodiments, the input light beam 401 may be provided in the desired LP1 polarization by a light source (not shown in FIGS. 4A, 4B). In some embodiments an optional polarizer 407 may be provided at the input pupil 405 of projector 400 to output the input beam 401 that is LP1-polarized. The input pupil 405 may be defined at a first, or input, face or side of PBS 420. The first PBS 410 may be configured to optically couple the input pupil 405 to SR 411 in LP1 polarization, and optically couple SR 411 to the concave reflector 431 in LP2 polarization. The second PBS 420 may be configured to optically couple SR 412 to the second concave reflector 432 in one of LP1 or LP2 polarization, and to optically couple the second concave reflector 432 to the output pupil 455 in the other of the LP1 or LP2 polarization. An LP1 to LP2 polarization converter 445, such as a suitably oriented half-wave plate (HWP), may be optionally provided between an output face or side 414 of PBS 410 and an input face or side 421 of PBS 420.

In the embodiment illustrated in FIGS. 4A and 4B, the input light beam 401 is p-polarized at the input pupil 405, and is transmitted toward SR 411 in a first pass through PBS 410. After passing through QWP 441, which is oriented to change the polarization of the beam to circular, the beam is reflected off the first SR 411, which is shown for illustration in a tilted state. SR 411 steers the beam away from an input axis C1 by twice the first tilt angle $\theta_1$ of SR 411 about an x-directed axis 417 (FIG. 4B) in accordance with the laws of reflection. The input beam 401 steered by SR 411 may be referred as the first steered beam 401A. The reflection off SR 411 directs the beam generally back toward the first PBS 410 for a second pass therethrough. Passing through QWP 441 for a second time changes the beam to s-polarization (or LP2).

The second pass through PBS 410 re-directs the beam, now in s-polarization, toward the first concave mirror 431 via the second QWP 442. A reflection off the first concave mirror 431 directs the beam generally back toward PBS 410 via a second pass through QWP 442, which changes the beam back to the p-polarization (LP1), which PBS 410 transmits through. Thus the third pass through the first PBS 410 directs the beam toward an output side or face 414 of PBS 410. An input side 421 of the second PBS 420 may be located proximate to the output side or face 414 of PBS 410 to receive the beam therefrom. A half-wave plate 445 may be disposed between the output face or side 414 of PBS 410 and the input face or side 421 of PBS 420 to convert the beam to an orthogonal polarization.

In the illustrated embodiment, the beam reflected from the concave mirror 431 passes through PBS 410 as p-polarized light, is converted by the HWP 445 to s-polarized light, and is directed toward SR 412 by reflection off the polarization routing surface 425 in a first pass through PBS 420. After passing through the third QWP 443, which is oriented to change the polarization of the beam to circular, the beam is reflected off the second SR 412, which steers the beam in accordance with its tilt angle $\theta_2$ about a z-directed axis 419 (FIG. 4B). After being steered by the second SR 412, the first steered beam 401A may be referred as the image beam 401B.

The reflection off SR 412 directs the beam generally back toward PBS 420 through the third QWP 443, which changes the beam to p-polarization. The second pass through PBS 420 directs the beam through the polarization routing surface 425 and the fourth QWP 444 toward the second concave mirror 432. A reflection off the second concave mirror 432 directs the beam generally back toward PBS 420 passing again through QWP 444, which changes the beam to the s-polarization. The third pass through PBS 420 re-directs the s-polarized image beam 401B toward an output lens 453 and the output pupil 455 by reflection upon the polarization routing surface 425.

Figure 5A:
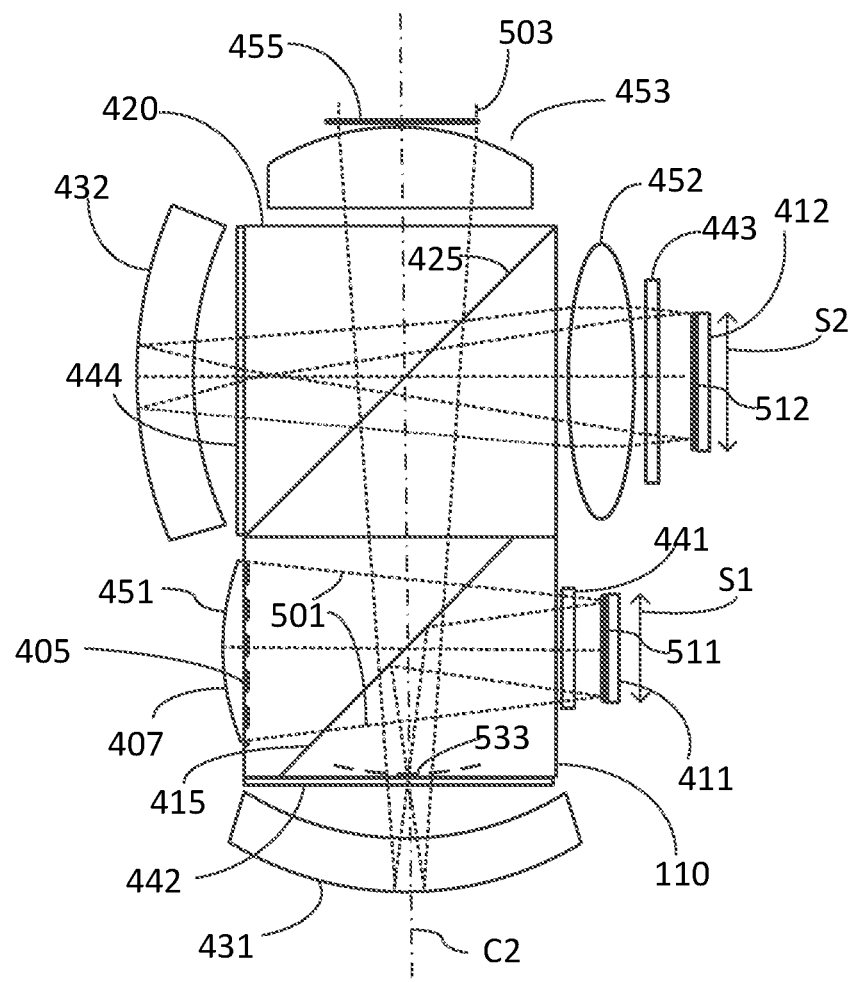
FIG. 5A is a schematic diagram of the image projector of FIGS. 4A and 4B generally illustrating beam focusing and collimation by its optical elements.

Referring to FIG. 5A, the operation of pupil replication or pupil imaging optics of projector 400 in one embodiment thereof is illustrated. An input beam 501, as it propagates through projector 400, is schematically outlined with dotted lines, which in this figure indicate the beam "edges". Note that input beams that are narrower than illustrated could be used. The beam propagation is illustrated for nominal, i.e. not tilted, positions of SR 411 and 412 by way of example; in these SR positions, the beam may have a substantially normal incidence at each of the SRs 411 and 412, and may also have on-axis incidence on the concave reflectors 431 and 432. Here substantially normal means accounting for fabrication tolerance, generally within +\-2°, or in some embodiments within +\-5°. In the illustrated embodiment the pupil replication is focal, i.e. the input beam 501 is not collimated at the input pupil 405 of the projector, but converges at some location on a focal surface 533, which may be within the projector's first stage or between the stages. Embodiments with a virtual focus surface 533 located behind the concave reflector 431 may also be envisioned. In the illustrated embodiment an input focusing lens 451 may be provided at the input facet or side of PBS 410 to provide a convergent beam that has a size $S_1$ at the light reflecting face of SR 411 in its nominal, not-tilted state. The input pupil 405 may be defined by a light-accepting face of lens 451, or a central portion thereof. $S_1$ may represent, for example, the beam diameter at SR 411. The light reflecting face of SR 411 defines a first pupil 511, which size may be substantially $S_1/\cos(\theta_{1max})$ to avoid clipping the beam when the SR is tilted, or slightly large to account for tolerances, for example 10% larger. Here, $\theta_{1max}$ represents a maximum tilt angle of SR 411 expected during projector operation. In some embodiments the reflecting face of SR 411 may be elliptical.

The pupil replicating optics of projector 400 operates so as to make the location illuminated by beam 501 at the output pupil 455 substantially independent on the tilt angle $\theta_1$ of the first SR 411 and the tilt angle $\theta_2$ of the second SR 412 within their respective angular ranges of operation. It provides an image beam 503 emanating from the output pupil 455 that is capable of scanning in the angle space within the projector's FOV substantially without lateral spatial displacement of the beam at the output pupil 455. Here substantially means accounting for system tolerances, generally with a lateral displacement less than 5% of the diameter of image beam 503 and preferably less than 10% of the diameter of the image beam in some embodiments.

In the illustrated embodiment the pupil replicating optics of projector 400 includes the input focusing lens 451, two concave mirrors 431 and 432, a second focusing lens 452 that may be disposed at the second SR 412, and an output lens 453 disposed at the output pupil 455. In some embodiments the output pupil 455 may be at a distance from lens 453. The first concave mirror 431 and the second focusing lens 452, which may be referred to as the first pupil replicating optics or the first pupil relay, cooperate to replicate or relay the first pupil 511 defined at SR 411 onto a second pupil 512 defined at SR 412, so that the input beam 501 hits the light reflecting face of SR 412 for any tilt angle $\theta_1$ of SR 411 within an operating range thereof, e.g. from $-\theta_{1max}$ to $+\theta_{1max}$. By way of example, $\theta_{1max}$ can be in the range from 10 to 40 degrees. The input lens 451 may cooperate with the concave mirror 431 to define the focal surface 533 where beam 501 converges after reflecting off the concave mirror 431. Lens 452 may be configured to cooperate with the concave mirror 431 to image the first pupil 511 onto the second pupil 512 with a magnification X, in which case the second SR 412 may be greater in size than the first SR 411 by a factor of X (linear). The magnification factor X depends on the optical distance between SRs 411 and 412, the radius of curvature of concave mirror 431, and to some extent on the optical power of lens 452, and may be suitably adjusted by varying one or more of these parameters. The magnification factor X may be greater than 1 when the optical path between SR 411 and the concave mirror 431 is shorter than the optical path between the concave mirror 431 and SR 412. In some embodiments the optical power of the concave mirror 431 may be selected to image SR 411 to SR 412 with the magnification factor X. In embodiments in which the beam is relayed from the first SR 411 to the second SR 412 with magnification, the second SR 412 may be proportionally greater in size than the first SR 411. By way of example, in a projector with the pupil magnification X between the first and second SRs 411 and 412, the light reflecting face of SR 412, which defines the second pupil 512, may have a size of substantially $X \cdot S_1/\cos(\theta_{2max})$, or slightly large to account for tolerances, for example 10% larger. Here, $\theta_{2max}$ represents a maximum tilt angle of SR 412 expected during projector operation. By way of example, $\theta_{2max}$ can be in the range from 10 to 40 degrees. By way of a non-limiting example, X may be equal to 1.4+−10%.

The second concave mirror 432 and the output lens 453 cooperate with the second focusing lens 452 to relay the second pupil 512 onto the output pupil 455, and may be referred to as the second pupil relaying optics or the second pupil relay. The second focusing lens 452, which may be shared with the first pupil relay, may cooperate with the second concave mirror 432 and the output lens 453 to image the second pupil 512 onto the output pupil 455. In embodiments where lenses 452 and 453 are close to respective pupil planes, SR 412 may be imaged onto the output pupil 455 primarily by the optical power of the concave mirror 431. The second pupil relaying optics may replicate or relay the second pupil 512 to the output pupil 455 either with or without magnification.

Figure 5B:
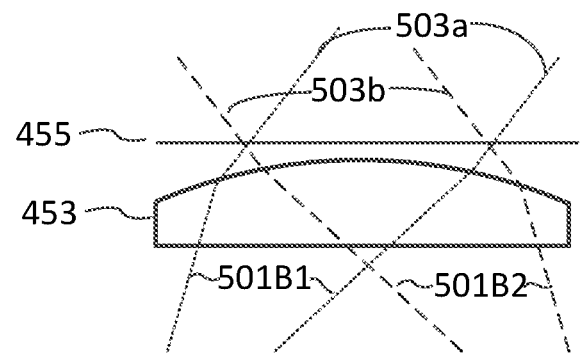
FIG. 5B is a schematic diagram illustrating the operation of an output lens of the projector of FIGS. 4A-5A.

Advantageously, in embodiments where the SRs 411 and 412 are orthogonally oriented 1D scanners, the FOV of projector 400 may be adjusted independently in two orthogonal planes, which may correspond for example to the vertical and horizontal dimensions when used in a NED. When image beam 401B is steered by one of the first and second SRs 411, 412, the image beam 401B may scan across an input face of the output focusing lens 453, changing the location of its incidence upon the lens. The output focusing lens 453 is configured to convert this change of location to a change in angle of the output beam 503. This is schematically illustrated in FIG. 5B, which shows image beams 501B1 and 502B2, outlined by dotted and dashed lines, respectively, that are incident upon the output focusing lens 453. The two image beams 501B1 and 501B2 may correspond to two different tilt angles of, for example, SR 411, and may be spatially shifted relative to each other as they enter the output lens 453. These two image beams are converted by lens 453 into output scanning beams 503a and 503b which substantially overlap at the output pupil 455 generally without a lateral shift therebetween, and emerge from it at different angles.

Figure 6:
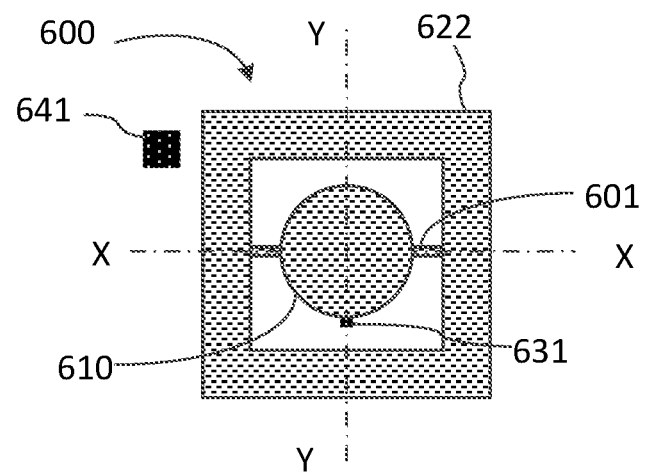
FIG. 6 is a schematic plan view of a MEMS scanner.

Referring to FIG. 6, each of the SRs 411 and 412 may be for example in the form of a uni-axial MEMS scanner 600, where "MEMS" stands for a micro electro-mechanical system. It includes a scanning reflector 610, e.g. a mirror, supported by a pair of torsional hinges 601 allowing tilting the scanning reflector 610 about an "X" axis. The torsional hinges 601 extend from the scanning reflector 610 to a fixed base 622, for tilting the scanning reflector 610 about "X" axis. Note that the "X" axis of FIG. 6 may represent either the x-axis or the z-axis of the Cartesian coordinate system 477 of FIGS. 4A and 4B. Actuators may be disposed underneath the scanning reflector 610 for providing a force for actuating the tilt of the scanning reflector 610 about the "X" axis. The actuators may be electrostatic, electro-magnetic, piezo-electric, etc. For electrostatic mirror actuation, a comb drive may be located on the torsional hinge members. For example, in the embodiment shown in FIG. 6, an actuator 631 may be disposed under an edge of reflector 610 to tilt the scanning reflector 610 about X-axis. In some embodiments a biaxial scanning reflector may be used, in which torsional hinges 601 extend from the scanning reflector 610 to a gimbal ring (not shown), which is supported by a second pair of torsional hinges (not shown) extending from the gimbal ring to the fixed base 322, for tilting the gimbal ring and the scanning reflector 610 as a whole about "Y" axis.

A feedback circuit 641 may be provided for providing feedback information about the angles of tilt of the scanning reflector 610. The feedback circuit 641 may for example measure electric capacitance between the electrostatic actuator 631 and the scanning reflector 610 to determine the tilt angle θ. Separate electrodes may also be provided specifically for the feedback circuit 641. The capacitance may be measured via voltage measurements, and/or via a radio-frequency (RF) reflection from portion(s) of the scanning reflector 610 and a phase detector using, for example, a frequency mixer and low-pass filter. In some embodiments, a small magnet may be placed on the scanning reflector 610, and a nearby pickup coil e.g. fixed to the base 622 may be used to pick oscillations of the scanning reflector 610. Furthermore in some embodiments, an optical signal may be reflected from the scanning reflector 610 and a photodetector may be used to detect the reflected beam. The photodetector may or may not have spatial resolution. For spatial resolution detectors, a detector array or a quadrant detector may be used. Sync pulses or signals may be generated at specific angles of tilt of the scanning reflector 610, e.g. when crossing a zero tilt angle.

In some embodiments, the first and second SRs 411 and 412 may be implemented using two 1D MEMS tiltable reflectors 610 supported by two different bases 622. In some embodiments, the first and second SRs 411 and 412 may be implemented using two MEMS tiltable reflectors 610 supported by the same base 622. In some embodiments, raster scan signals may be provided to each actuator 631 of the two tiltable reflectors 610 with non-parallel, e.g. orthogonal, tilt axes to implement a 2D raster scan pattern of the image beam. In some embodiments one or more tiltable reflectors 610 may be operated in a resonant mode for speed and energy efficiency. In the resonant mode of operation, a tiltable reflector 610 oscillates about its tilt axis at a near-resonance frequency, and the beam is pulse-modulated in time in accordance with an image pattern. In a pair of tiltable reflectors such as 1D MEMS scanners coupled via a pupil relay and oscillating about non-parallel axes, the oscillations are decoupled from one another, which simplifies the overall trajectory prediction.

It is noted that the 1D MEMS scanner 600 is only an example of a scanner implementation. Many other implementations are possible, including refractive and diffractive beam scanners. When implemented with MEMS, various comb structures may be used to provide an increased electrostatic attraction force between electrodes. Comb and/or honeycomb structures may be used to stiffen the tiltable reflector 610. The tiltable reflector 610 may include a mirror surface, a multilayer dielectric reflector, etc. The tiltable reflector 610 may be located at the center of the 1D MEMS scanner 600, or may be offset from the center if required. Two or more of 1D MEMS scanners with parallel and/or non-parallel, including orthogonal, tilt axes may be supported by the same base 622.

Referring back to FIGS. 4A, 4B, and 5A, the PBS 410 and 420 may be in the form of, or include, polarization splitting cubes or prisms with one of their optical axes aligned along a common optical axis C2, which may be parallel to the z-axis in FIGS. 4A, 4B, with an output face 414 of PBS 410 proximate to an input face 421 of PBS 420 and parallel thereto. The polarization routing surfaces 415 and 425 may be oriented at 45 degrees to the common optical axis C2 of the two PBS. The PBS cubes or prisms embodying PBS 410 and 420 may be of the same size or of differing sizes. FIGS. 4A and 4B illustrate an embodiment with optical magnification from SR 411 to SR 412, as described above; in such embodiments, PBS 410 may be physically smaller than PBS 420 in at least one dimension as it routs a smaller-diameter beam.

Furthermore, in the example embodiment described above, SR 411 of the first steering stage is aligned with the input pupil 405 of the projector, and is coupled therewith in transmission for p-polarization, while being coupled to the first concave mirror 431 in reflection for s-polarization. The optical axis of the concave reflector 431, defined by a vortex and a center of curvature thereof, may be generally perpendicular to the direction of the first pass of the input beam 401 through PBS 410. However, in other embodiments the input pupil 451, the first SR 411, and the concave mirror 431 may be positioned differently relative to the output face 414 of PBS 410. For example, in one embodiment the locations of SR 411 and concave mirror 431 may be switched, in which case the input light beam 401 may be s-polarized at the input pupil 405. In another embodiment, the locations of the input pupil 405 and the first concave reflector 431 may be switched, with the input light beam 401 again in the s-polarization state as it enters PBS 410 for the first pass. Similarly, the positioning of SR 412, output pupil 455, and the second concave mirror 432 relative to PBS 420 in the second stage may be different from the example embodiment illustrated in FIGS. 4A, 4B, and 5.

Furthermore, in the example embodiment described above the respective polarization routing surfaces 415, 425 of PBS 410 and 420 transmit p-polarized light and reflect s-polarized light. However, embodiments may be envisioned in which the polarization routing surfaces 415, 425 of PBS 410 and 420 are configured to operate with other orthogonal pairs of polarization states. Furthermore, in some embodiments the respective polarization routing surfaces 415, 425 of PBS 410 and 420 may not be parallel to each other.

Generally, the second SR 412 and the second concave mirror 432 may be positioned at any of five remaining "free" faces of PBS 420, with the polarization routing surface 425 of the second PBS 420 suitably oriented to couple SR 412 to the input face 421 for one polarization state and to couple SR 412 to the second concave reflector 432 in the orthogonal polarization state. In some embodiments, the polarization routing surfaces 415, 425 of PBS 410 and 420 may incline in different planes.

Figure 7:
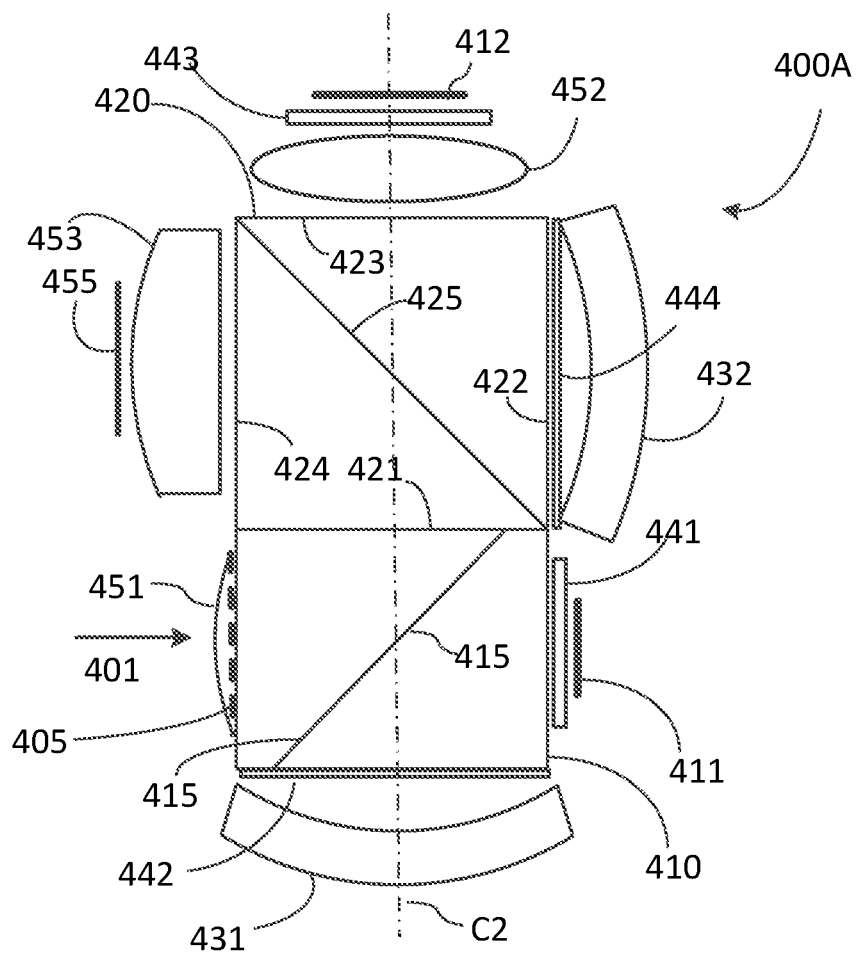
FIG. 7 is a schematic diagram of an embodiment of the image projector of FIGS. 4A-5A with an alternative placement of tiltable reflectors.

FIG. 7 illustrates an example embodiment 400A of projector 400 where the configuration of the second stage generally repeats that of the first stage with a 90 degree counter-clockwise rotation. In this example configuration, SR 412 is disposed at a PBS face 423 of PBS 420 across from the input PBS face 421 and is thus coupled thereto in transmission for p-polarized light. In this configuration, a HWP between PBS 410 and 420 is not needed. The second concave mirror 432 is disposed with its optical axis at 90 degrees from the common optical axis C2 of PBS 410 and 420, and across from the output pupil 455, so as to receive s-polarized image light steered by SR 412 after it is reflected by the polarization routing surface 425. In the illustrated embodiment the input pupil 405 and the output pupil 455 are on the same side of the projector. In another embodiment PBS 420 may be rotated by 180 degrees about the C2 axis, so that the polarization routing surfaces 415, 425 are parallel and the input pupil 405 and the output pupil 455 are on opposite sides of the projector.

Figure 8:
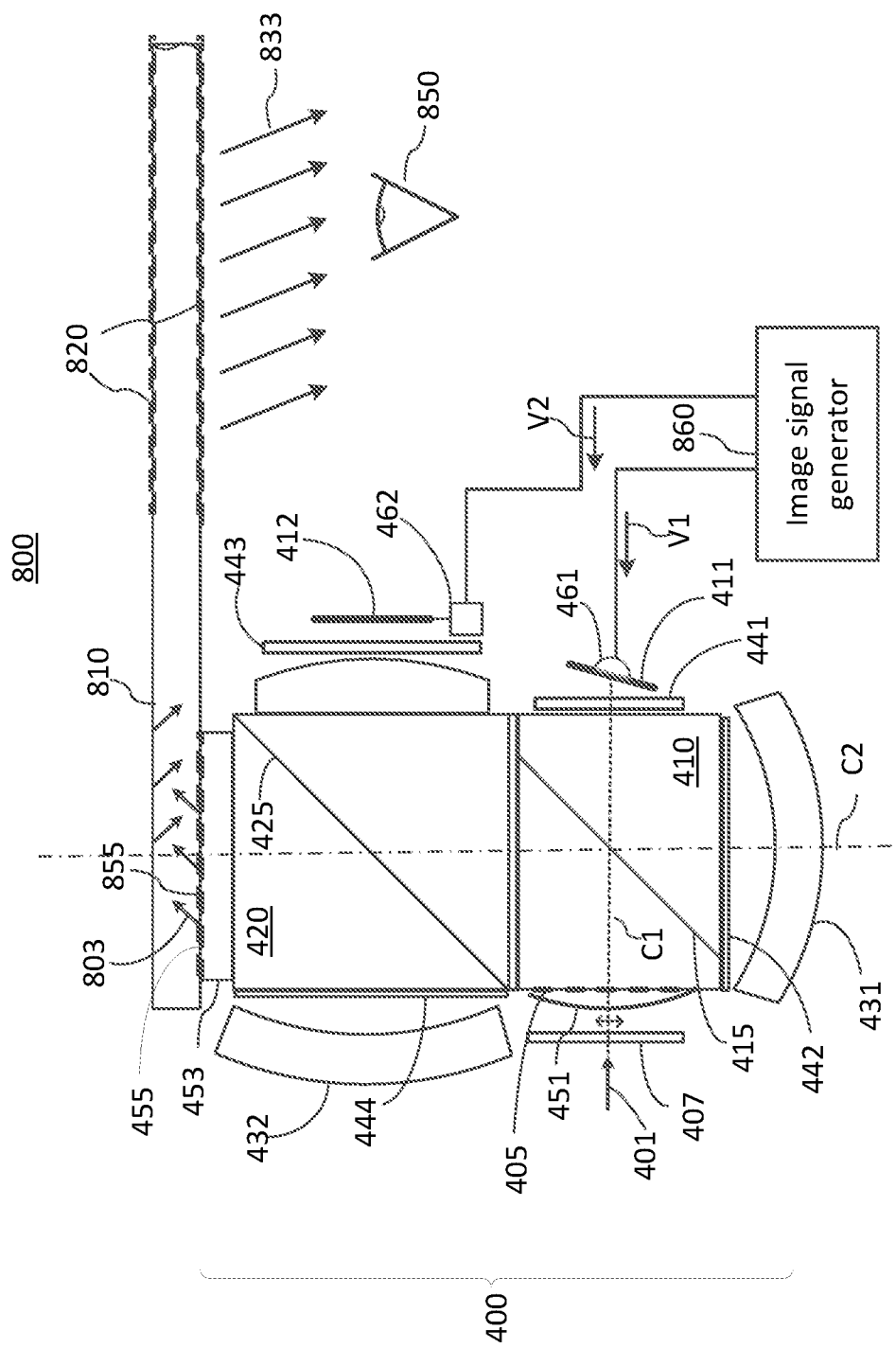
FIG. 8 is a schematic diagram illustrating elements of an NED using the image projector of FIG. 4A.

Referring to FIG. 8, the projector 400 may be used in an NED device 800, referred to as NED 800 in the following, to generate a scanning image beam 803 that may be relayed to an eye 850 of a user to form an image for the user. In the illustrated embodiment the output pupil 455 of projector 400 is coupled to in input coupler 855 of a waveguide 810, which also has one or more output couplers 820 which may be configured to expand the scanning image beam in size to provide an expanded image beam 833. In this embodiment, the waveguide 810 operates as a pupil expander or pupil replicator. The input coupler 855 may be in the form of, or include, one or two diffraction gratings or one or two coupling prisms. It may be sized to match the output pupil 455 of projector 400. The output coupler or couplers 820 may be for example in the form of one or more diffraction gratings, which in some embodiments may be holographically defined. By way of example, in one embodiment the input coupler 855 may be in the form, or include, a diffraction grating, such as a relief grating, with a grating vector $g_1$, and the output coupler 820 may be in the form, or include, a first output diffraction grating with a grating vector $g_2$ and a second output diffraction grating with a grating vector $g_3$, so that $g_1+g_2+g_3=0$. In such embodiments, an output angle of the expanded output image beam 833 is equal to an angle at which the scanning image beam 803 from projector 400 impinges the input coupler 855, so that the waveguide 810 relays the output FOV of projector 400 to the user's eye 850 one to one. NED 800 may include an image signal generating processor 860 that provides electrical images signals V1 and V2 to the first and second SRs 411 and 412, respectively. These signals may define the beam steering angles of an output beam 803 of the projector in two orthogonal planes, which may correspond to the vertical and horizontal scanning directions of an output beam 803 of the NED. The electrical images signals V1 and V2 may be synchronized with color and intensity modulation of the input beam 401 so that the NED output beam 803 draws a 2D image in the angle space to be converted in a spatial image in the eye 850 of the user. Advantageously, performing the vertical and horizontal scanning of the image beam using two 1D scanners enables independent adjustment of their characteristics, such as pixel density, scan frequency, raster size, etc, and produce a more predictable raster scan pattern than that available from biaxial scanners operating at near-resonance.

Figure 9:
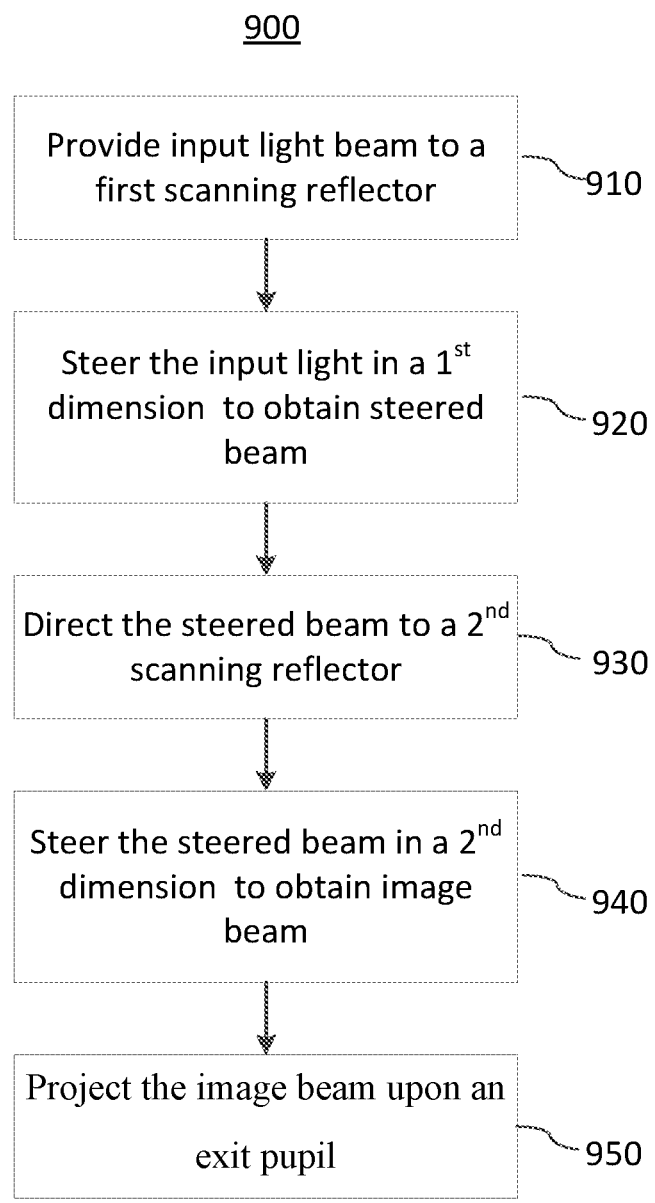
FIG. 9 is a flowchart of a method for forming a 2D image using two scanning reflectors.

Referring to FIG. 9, there is illustrated a method 900 for scanning a light beam according to an embodiment of the present disclosure. In the flowchart, each box represents a step or operation that may be performed by a scanning projector example embodiment of which have been described above, or one or more elements thereof, and may be referred to generally as a step. The method may include providing an input light beam to a first SR at step 910, steering the input light beam in at least a first plane with the first SR at step 920, relaying the input light beam from the first SR onto a second SR at step 930, steering the input light beam with the second SR in a second plane at step 940, and at step 950 relaying the input light beam from the second scanning reflector upon an output pupil at an angle defined by tilt angles of the first and second scanning reflectors. In some embodiments, step 930 may include using a first PBS coupled to a first concave reflector. In some embodiments, step 950 may include using a second PBS coupled to a second concave reflector. Step or operation 920 may include providing a first electrical image signal to an actuator of the first SR, with the first SR steering the beam in the first plane by a first angle defined by the first electrical image signal. Step or operation 940 may include providing a second electrical image signal to an actuator of the second SR, with the first to steer the beam in a second plane by a second angle defined by the second electrical image signal. Step or operation 950 may be performed so that a position of the image beam at the output pupil is generally independent on tilt angles of the first and second scanning reflectors within operating tilt angle ranges thereof. In some embodiments the first plane may be orthogonal to the second plane. In some embodiments the first plane may correspond to a vertical plane of a two-dimensional FOV supported by the projector, and the second plane may correspond to a horizontal plane of the 2D FOV supported by the projector.

In some embodiments, at least one of the two SRs 411, 412 may be configured as a 2D scanning reflector to scan the light beam it receives in two different, for example orthogonal, planes. A 2D SR may be implemented for example with a 2D tiltable reflector, such as a 2D MEMS reflector that is configured to tilt about two orthogonal axes. In one embodiment the first SR 411 may be implemented with a 2D TR that is operable to form a 2D image within an FOV defined in the angle space, and the second SR 412 as a 1D TR or a 2D TR operable to shift the FOV in the angle space, for example in response to a user-related or image-related signal. In some embodiments, these functions of the SR 411 and 412 may be switched.

Figure 10:
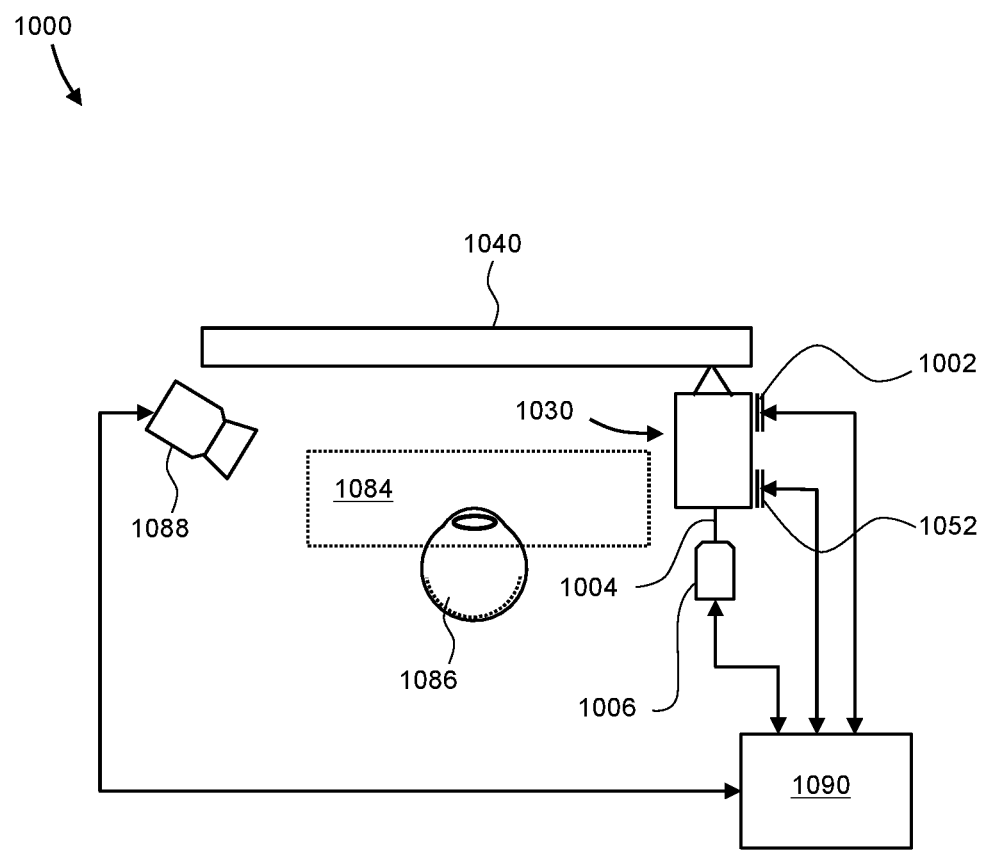
FIG. 10 is a schematic diagram illustrating an NED device including a two-stage scanning projector having a first stage for forming a 2D image in a FOV defined in an angle space, and a second stage operable to shift the FOV in the angle space responsive to changes in a user's gaze direction.

Turning to FIG. 10, a NED 1000 includes a light source 1006, a scanning projector 1030 coupled to an image light source 1006, and a pupil-replicating waveguide assembly 1040 coupled to the scanning projector 1030. NED 1000 may be an embodiment of NED 800 described above. The scanning projector 1030 may be embodied as described above with reference to the scanning projectors of FIGS. 1-5B, 7, and 8. In the embodiment shown in FIG. 10, the scanning projector 1030 includes first 1052 and second 1002 tiltable reflectors, e.g. MEMS reflectors tiltable about one or two axes. The tiltable reflectors 1052 and 1002 may represent the SRs 411 and 412 of the scanning projector 400 describe above. A controller 1090 is operably coupled to the light source 1006, the first 1052 and second 1002 tiltable reflectors, and to an optional eye tracker 1088. The function of the eye tracker 1088 is to determine at least one of position or orientation of a user's eye 1086 in an eyebox 1084, from which a gaze direction of the user may be determined in real time.

In operation, the controller 1090 operates the first 1052 and second 1002 tiltable reflectors to cause a light beam 1004 at the exit pupil of the scanning projector 1030 to have a beam angle corresponding to a pixel of an image to be displayed. The controller 1090 operates the image light source 1006 in coordination with the tiltable reflectors 1052, 1002 to form an image in angular domain for displaying to the user. The pupil-replicating waveguide assembly 1040 ensures that the image may be observed by the user's eye 1086 at any position of the user's eye 1086 in the eyebox 1084. In some embodiments, the eye tracker 1088 is operated to determine the gaze direction of the user.

In embodiments where each tiltable reflector 1002 and 1052 is a 2D tiltable reflector, one of them, e.g. the first tiltable reflector 1052, may be operated to scan the light beam 1004 in two non-parallel directions to form the image in the angular domain while the other, i.e. the second tiltable reflector 1002, may be operated to shift the entire image, i.e. to shift a FOV of the near-eye display 1000, towards the gaze direction of the user. The image being rendered by the controller 1090 may be updated accordingly, i.e. shifted in opposite direction by the same amount, to make sure that the virtual image is steady as the FOV is shifted. The resulting effect of "floating" FOV is similar to viewing a dark scenery by using a flashlight, where the flashlight is automatically turned in a direction of user's gaze, illuminating different parts of a surrounding scenery depending where the user is looking at the moment. As the rate of FOV shift is determined by the eye mobility which is generally slower than speed of scanning, the first tiltable reflector 1052 may be made smaller and faster, while the second tiltable reflector 1002 may be made larger and slower. In some embodiment the second tiltable reflector 1002 may be operable to shift the image in one dimension only, for example along a horizontal axis of the NED.

Embodiments of the present disclosure may include, or be implemented in conjunction with, an artificial reality system. An artificial reality system adjusts sensory information about outside world obtained through the senses such as visual information, audio, touch (somatosensation) information, acceleration, balance, etc., in some manner before presentation to a user. By way of non-limiting examples, artificial reality may include virtual reality (VR), augmented reality (AR), mixed reality (MR), hybrid reality, or some combination and/or derivatives thereof. Artificial reality content may include entirely generated content or generated content combined with captured (e.g., real-world) content. The artificial reality content may include video, audio, somatic or haptic feedback, or some combination thereof. Any of this content may be presented in a single channel or in multiple channels, such as in a stereo video that produces a three-dimensional effect to the viewer. Furthermore, in some embodiments, artificial reality may also be associated with applications, products, accessories, services, or some combination thereof, that are used to, for example, create content in artificial reality and/or are otherwise used in (e.g., perform activities in) artificial reality. The artificial reality system that provides the artificial reality content may be implemented on various platforms, including a wearable display such as an HMD connected to a host computer system, a standalone HMD, a near-eye display having a form factor of eyeglasses, a mobile device or computing system, or any other hardware platform capable of providing artificial reality content to one or more viewers.

Figure 11:
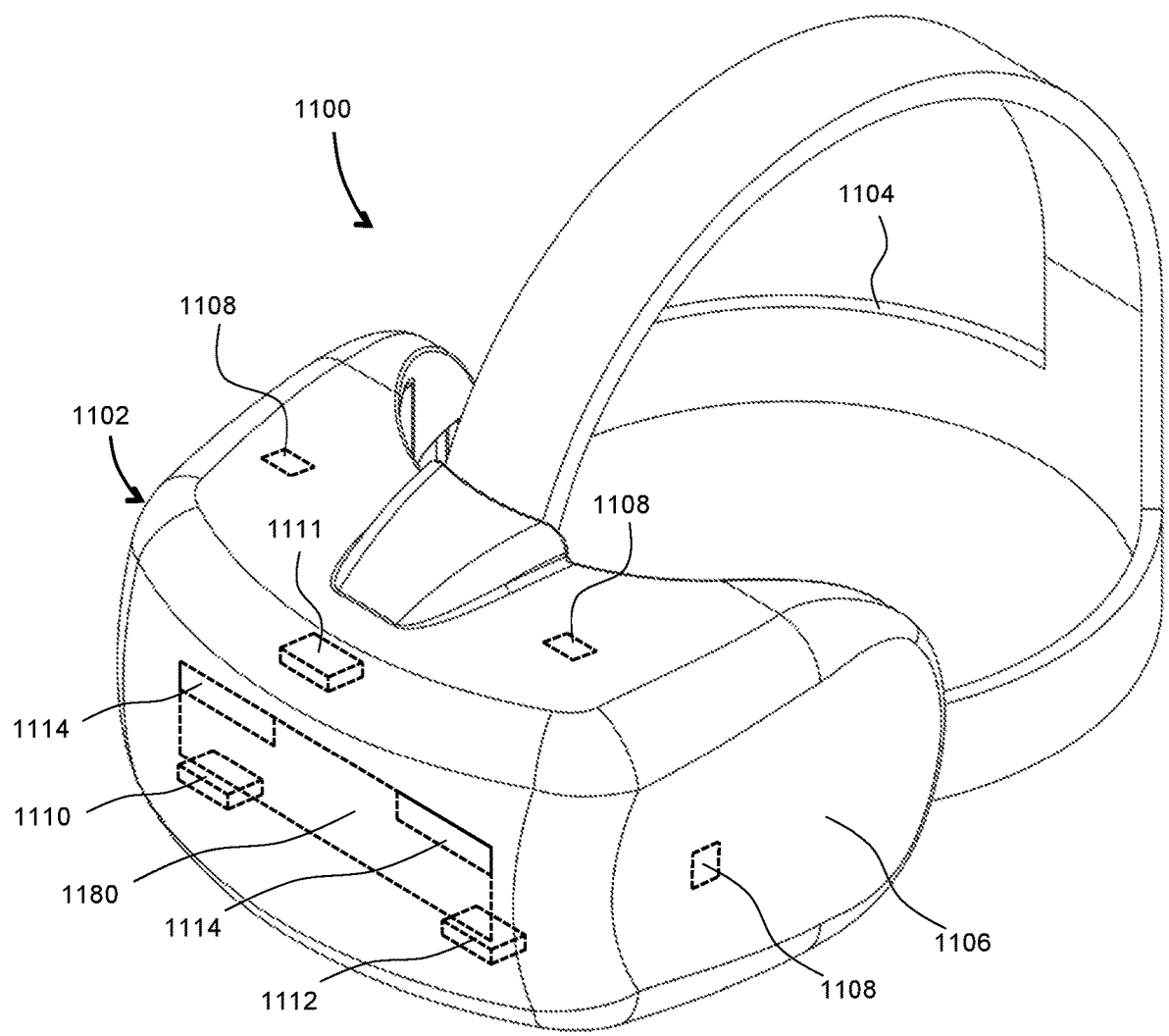
FIG. 11 is an isometric view of an example head-mounted display using the scanning projector of the present disclosure.

Referring to FIG. 11, an HMD 1100 is an example of an AR/VR wearable display system which encloses the user's face, for a greater degree of immersion into the AR/VR environment. The function of the HMD 1100 is to augment views of a physical, real-world environment with computer-generated imagery, and/or to generate the entirely virtual 3D imagery. The HMD 1100 may include a front body 1102 and a band 1104. The front body 1102 is configured for placement in front of eyes of a user in a reliable and comfortable manner, and the band 1104 may be stretched to secure the front body 1102 on the user's head. A display system 1180 may be disposed in the front body 1102 for presenting AR/VR imagery to the user. The display system 1180 may for example include two optical waveguides for relaying scanning image beams to the eyes of the user from scanning projectors 1114. Sides 1106 of the front body 1102 may be opaque or transparent.

In some embodiments, the front body 1102 includes locators 1108 and an inertial measurement unit (IMU) 1110 for tracking acceleration of the HMD 1100, and position sensors 1112 for tracking position of the HMD 1100. The IMU 1110 is an electronic device that generates data indicating a position of the HMD 1100 based on measurement signals received from one or more of position sensors 1112, which generate one or more measurement signals in response to motion of the HMD 1100. Examples of position sensors 1112 include: one or more accelerometers, one or more gyroscopes, one or more magnetometers, another suitable type of sensor that detects motion, a type of sensor used for error correction of the IMU 1110, or some combination thereof. The position sensors 1112 may be located external to the IMU 1110, internal to the IMU 1110, or some combination thereof.

The locators 1108 are traced by an external imaging device of a virtual reality system, such that the virtual reality system can track the location and orientation of the entire HMD 1100. Information generated by the IMU 1110 and the position sensors 1112 may be compared with the position and orientation obtained by tracking the locators 1108, for improved tracking accuracy of position and orientation of the HMD 1100. Accurate position and orientation is important for presenting appropriate virtual scenery to the user as the latter moves and turns in 3D space.

The HMD 1100 may further include a depth camera assembly (DCA) 1111, which captures data describing depth information of a local area surrounding some or all of the HMD 1100. To that end, the DCA 1111 may include a laser radar (LIDAR), or a similar device. The depth information may be compared with the information from the IMU 1110, for better accuracy of determination of position and orientation of the HMD 1100 in 3D space.

The HMD 1100 may further include an eye tracking system for determining orientation and position of user's eyes in real time. The obtained position and orientation of the eyes also allows the HMD 1100 to determine the gaze direction of the user and to adjust the image generated by the display system 1180 accordingly. In one embodiment, the vergence, that is, the convergence angle of the user's eyes gaze, is determined. The determined gaze direction and vergence angle may also be used for real-time compensation of visual artifacts dependent on the angle of view and eye position. Furthermore, the determined vergence and gaze angles may be used for interaction with the user, highlighting objects, bringing objects to the foreground, creating additional objects or pointers, etc. An audio system may also be provided including e.g. a set of small speakers built into the front body 1102.

Figure 12:
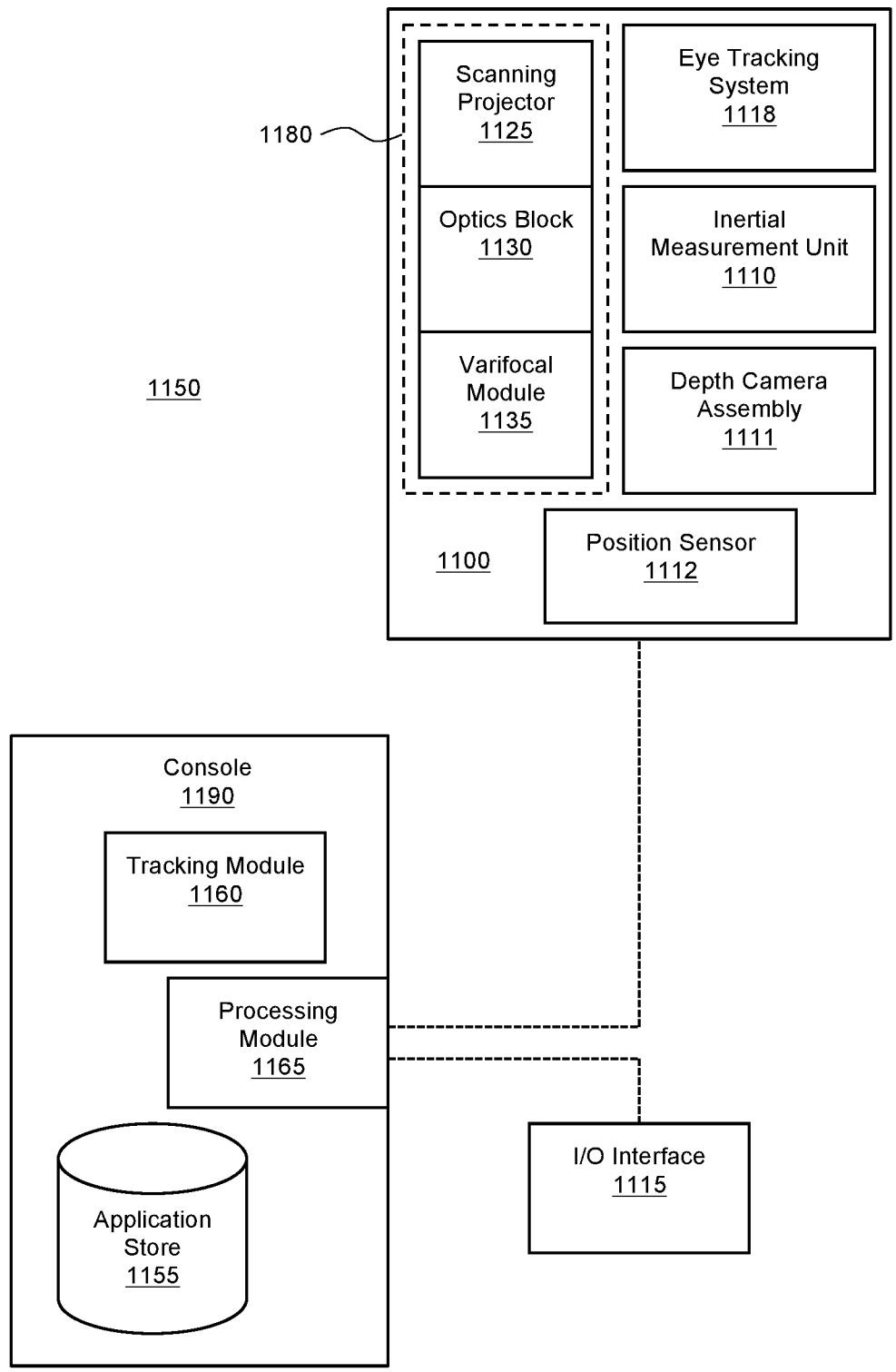
FIG. 12 is a block diagram of a virtual reality system including the headset of FIG. 11.

Referring to FIG. 12, an AR/VR system 1150 includes the HMD 1100 of FIG. 11A, an external console 1190 storing various AR/VR applications, setup and calibration procedures, 3D videos, etc., and an input/output (I/O) interface 1115 for operating the console 1190 and/or interacting with the AR/VR environment. The HMD 1100 may be "tethered" to the console 1190 with a physical cable, or connected to the console 1190 via a wireless communication link such as Bluetooth®, Wi-Fi, etc. There may be multiple HMDs 1100, each having an associated I/O interface 1115, with each HMD 1100 and I/O interface(s) 1115 communicating with the console 1190. In alternative configurations, different and/or additional components may be included in the AR/VR system 1150. Additionally, functionality described in conjunction with one or more of the components shown in FIGS. 11 and 12 may be distributed among the components in a different manner than described in conjunction with FIGS. 11 and 12 in some embodiments. For example, some or all of the functionality of the console 1190 may be provided by the HMD 1100, and vice versa. The HMD 1100 may be provided with a processing module capable of achieving such functionality.

As described above with reference to FIG. 11, the HMD 1100 may include the eye tracking system 1118 for tracking eye position and orientation, determining gaze angle and convergence angle, etc., the IMU 1110 for determining position and orientation of the HMD 1100 in 3D space, the DCA 1111 for capturing the outside environment, the position sensor 1112 for independently determining the position of the HMD 1100, and the display system 1180 for displaying AR/VR content to the user. In some embodiments the display system 1180 includes (FIG. 11) a scanning projector 1125. The display system 1180 may further include an optics block 1130, whose function may be to convey the images generated by the scanning projector 1125 to the user's eye. The optics block may include various lenses, e.g. a refractive lens, a Fresnel lens, a diffractive lens, an active or passive Pancharatnam-Berry phase (PBP) lens, a liquid lens, a liquid crystal lens, etc., a pupil-replicating waveguide, grating structures, coatings, etc. The display system 1180 may further include a varifocal module 1135, which may be a part of the optics block 1130.

The I/O interface 1115 is a device that allows a user to send action requests and receive responses from the console 1190. An action request is a request to perform a particular action. For example, an action request may be an instruction to start or end capture of image or video data or an instruction to perform a particular action within an application. The I/O interface 1115 may include one or more input devices, such as a keyboard, a mouse, a game controller, or any other suitable device for receiving action requests and communicating the action requests to the console 1190. An action request received by the I/O interface 1115 is communicated to the console 1190, which performs an action corresponding to the action request. In some embodiments, the I/O interface 1115 includes an IMU that captures calibration data indicating an estimated position of the I/O interface 1115 relative to an initial position of the I/O interface 1115. In some embodiments, the I/O interface 1115 may provide haptic feedback to the user in accordance with instructions received from the console 1190. For example, haptic feedback can be provided when an action request is received, or the console 1190 communicates instructions to the I/O interface 1115 causing the I/O interface 1115 to generate haptic feedback when the console 1190 performs an action.

The console 1190 may provide content to the HMD 1100 for processing in accordance with information received from one or more of: the IMU 1110, the DCA 1111, and the I/O interface 1115. In the example shown in FIG. 12, the console 1190 includes an application store 1155, a tracking module 1160, and a processing module 1165. Some embodiments of the console 1190 may have different modules or components than those described in conjunction with FIG. 12. Similarly, the functions further described below may be distributed among components of the console 1190 in a different manner than described in conjunction with FIGS. 11 and 12.

The application store 1155 may store one or more applications for execution by the console 1190. An application is a group of instructions that, when executed by a processor, generates content for presentation to the user. Content generated by an application may be in response to inputs received from the user via movement of the HMD 1100 or the I/O interface 1115. Examples of applications include: gaming applications, presentation and conferencing applications, video playback applications, or other suitable applications.

The tracking module 1160 may calibrate the AR/VR system 1150 using one or more calibration parameters and may adjust one or more calibration parameters to reduce error in determination of the position of the HMD 1100 or the I/O interface 1115. Calibration performed by the tracking module 1160 also accounts for information received from the IMU 1110 in the HMD 1100 and/or an IMU included in the I/O interface 1115, if any. Additionally, if tracking of the HMD 1100 is lost, the tracking module 1160 may re-calibrate some or all of the AR/VR system 1150.

The tracking module 1160 may track movements of the HMD 1100 or of the I/O interface 1115, the IMU 1110, or some combination thereof. For example, the tracking module 1160 may determine a position of a reference point of the HMD 1100 in a mapping of a local area based on information from the HMD 1100. The tracking module 1160 may also determine positions of the reference point of the HMD 1100 or a reference point of the I/O interface 1115 using data indicating a position of the HMD 1100 from the IMU 1110 or using data indicating a position of the I/O interface 1115 from an IMU included in the I/O interface 1115, respectively. Furthermore, in some embodiments, the tracking module 1160 may use portions of data indicating a position or the HMD 1100 from the IMU 1110 as well as representations of the local area from the DCA 1111 to predict a future location of the HMD 1100. The tracking module 1160 provides the estimated or predicted future position of the HMD 1100 or the I/O interface 1115 to the processing module 1165.

The processing module 1165 may generate a 3D mapping of the area surrounding some or all of the HMD 1100 ("local area") based on information received from the HMD 1100. In some embodiments, the processing module 1165 determines depth information for the 3D mapping of the local area based on information received from the DCA 1111 that is relevant for techniques used in computing depth. In various embodiments, the processing module 1165 may use the depth information to update a model of the local area and generate content based in part on the updated model.

The processing module 1165 executes applications within the AR/VR system 1150 and receives position information, acceleration information, velocity information, predicted future positions, or some combination thereof, of the HMD 1100 from the tracking module 1160. Based on the received information, the processing module 1165 determines content to provide to the HMD 1100 for presentation to the user. For example, if the received information indicates that the user has looked to the left, the processing module 1165 generates content for the HMD 1100 that mirrors the user's movement in a virtual environment or in an environment augmenting the local area with additional content. Additionally, the processing module 1165 performs an action within an application executing on the console 1190 in response to an action request received from the I/O interface 1115 and provides feedback to the user that the action was performed. The provided feedback may be visual or audible feedback via the HMD 1100 or haptic feedback via the I/O interface 1115.

In some embodiments, based on the eye tracking information (e.g., orientation of the user's eyes) received from the eye tracking system, the processing module 1165 determines resolution of the content provided to the HMD 1100 for presentation to the user using the scanning projector 1125. In some embodiments, the processing module 1165 can further use the eye tracking information to adjust the image presented with the scanning projector 1125 to prevent vergence-accommodation conflict and/or to offset optical distortions and aberrations.

Figure 13:
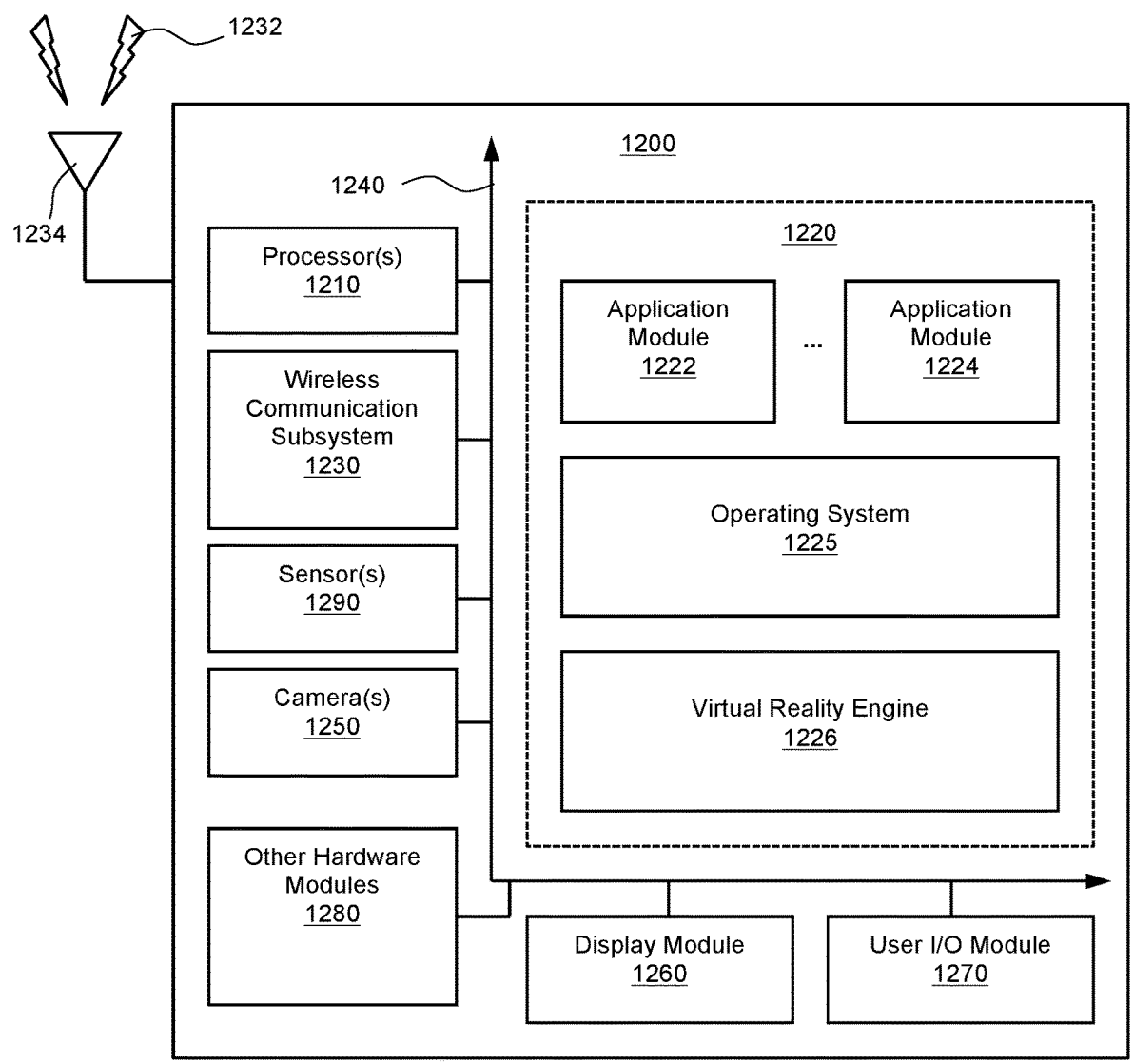
FIG. 13 is a functional block diagram of an example autonomous wearable display system according to an embodiment of the present disclosure.

Referring to FIG. 13, a simplified block diagram of an example electronic system 1200 is an example of a wearable display system for implementing some of the embodiments disclosed herein. The electronic system 1200 may include one or more processors 1210 and a memory 1220. Processor(s) 1210 may be configured to execute instructions for performing operations and methods disclosed herein and can be, for example, a general-purpose processor or a microprocessor suitable for implementation within a portable electronic device. Processor(s) 1210 may be communicatively coupled to a plurality of components within the electronic system 1200. To implement this communicative coupling, the processor(s) 1210 may communicate with other illustrated components across a bus 1240. The bus 1240 may be any subsystem adapted to transfer data within electronic system 1200. The bus 1240 may include a plurality of computer buses and additional circuitry to transfer data.

The memory 1220 may be operably coupled to the processor(s) 1210. In some embodiments, the memory 1220 may be configured for short-term and/or long-term storage, and may be divided into several units. The memory 1220 may be volatile, such as static random access memory (SRAM) and/or dynamic random access memory (DRAM) and/or non-volatile, such as read-only memory (ROM), flash memory, and the like. Furthermore, the memory 1220 may include removable storage devices, such as secure digital (SD) cards. The memory 1220 may provide storage of computer-readable instructions, data structures, program modules, and other data for the electronic system 1200. In some embodiments, the memory 1220 may be distributed in different hardware modules. A set of instructions and/or code might be stored on the memory 1220. The instructions might take the form of executable code that may be executable by the electronic system 1200, and/or might take the form of source and/or installable code, which, upon compilation and/or installation on the electronic system 1200 (e.g., using any of a variety of generally available compilers, installation programs, compression/decompression utilities, etc.), may take the form of executable code.

In some embodiments, the memory 1220 may store a plurality of application modules 1222 to 1224, which may include any number of applications. Examples of applications may include gaming applications, presentation or conferencing applications, video playback applications, or other suitable applications. The applications may include a depth sensing function and/or an eye tracking function. The application modules 1222 to 1224 may include particular instructions to be executed by processor(s) 1210. In some embodiments, certain applications or parts of the application modules 1222 to 1224 may be executable by other hardware modules 1280. In certain embodiments, the memory 1220 may additionally include secure memory, which may include additional security controls to prevent copying or other unauthorized access to secure information.

In some embodiments, the memory 1220 may include an operating system 1225 loaded therein. The operating system 1225 may be operable to initiate the execution of the instructions provided by the application modules 1222 to 1224 and/or manage the other hardware modules 1280, as well as interfaces with a wireless communication subsystem 1230, which may include one or more wireless transceivers. The operating system 1225 may be adapted to perform other operations across the components of the electronic system 1200 including threading, resource management, data storage control, and other similar functionality.

The wireless communication subsystem 1230 may include, for example, an infrared communication device, a wireless communication device and/or a chipset (such as a Bluetooth® device, an IEEE 802.11 device, a Wi-Fi device, a WiMax device, cellular communication facilities, etc.), and/or similar communication interfaces. The electronic system 1200 may include one or more antennas 1234 for wireless communication as part of the wireless communication subsystem 1230 or as a separate component coupled to any portion of the electronic system 1200. Depending on the desired functionality, the wireless communication subsystem 1230 may include separate transceivers to communicate with base transceiver stations and other wireless devices and access points, which may include communicating with different data networks and/or network types, such as wireless wide-area networks (WWANs), wireless local area networks (WLANs), or wireless personal area networks (WPANs). A WWAN may be, for example, a WiMax (IEEE 802.16) network. A WLAN may be, for example, an IEEE 802.11x network. A WPAN may be, for example, a Bluetooth network, an IEEE 802.15x, or some other types of network. The techniques described herein may also be used for any combination of WWAN, WLAN, and/or WPAN. The wireless communications subsystem 1230 may permit data to be exchanged with a network, other computer systems, and/or any other devices described herein. The wireless communication subsystem 1230 may include a means for transmitting or receiving data, such as identifiers of HMD devices, position data, a geographic map, a heat map, photos, or videos, using the antenna(s) 1234 and wireless link(s) 1232. The wireless communication subsystem 1230, the processor(s) 1210, and the memory 1220 may together comprise at least a part of one or more of a means for performing some functions disclosed herein.

In some embodiments, the electronic system 1200 includes one or more sensors 1290. The sensor(s) 1290 may include, for example, an image sensor, an accelerometer, a pressure sensor, a temperature sensor, a proximity sensor, a magnetometer, a gyroscope, an inertial sensor (e.g., a module that combines an accelerometer and a gyroscope), an ambient light sensor, or any other similar module operable to provide sensory output and/or receive sensory input, such as a depth sensor or a position sensor. For example, in some implementations, the sensor(s) 1290 may include one or more inertial measurement units (IMUs) and/or one or more position sensors. An IMU may generate calibration data indicating an estimated position of the HMD device relative to an initial position of the HMD device, based on measurement signals received from one or more of the position sensors. A position sensor may generate one or more measurement signals in response to motion of the HMD device. Examples of the position sensors may include, but are not limited to, one or more accelerometers, one or more gyroscopes, one or more magnetometers, another suitable type of sensor that detects motion, a type of sensor used for error correction of the IMU, or some combination thereof. The position sensors may be located external to the IMU, internal to the IMU, or some combination thereof. At least some sensors may use a structured light pattern for sensing.

The electronic system 1200 may further include a display module 1260. The display module 1260 may be a near-eye display, and may graphically present information such as images, videos, and various instructions, from the electronic system 1200 to a user. Such information may be derived from one or more of the application modules 1222 to 1224, a virtual reality engine 1226, the one or more other hardware modules 1280, a combination thereof, or any other suitable means for resolving graphical content for the user (e.g., by the operating system 1225). The display module 1260 may include scanning display technology, for example using a two-stage scanning projector as described above.

The electronic system 1200 may further include a user input/output module 1270 allowing a user to send action requests to the electronic system 1200. An action request may be a request to perform a particular action. For example, an action request may be to start or end an application or to perform a particular action within the application. The user input/output module 1270 may include one or more input devices. Example input devices may include a touchscreen, a touch pad, microphone(s), button(s), dial(s), switch(es), a keyboard, a mouse, a game controller, or any other suitable device for receiving action requests and communicating the received action requests to the electronic system 1200. In some embodiments, the user input/output module 1270 may provide haptic feedback to the user in accordance with instructions received from the electronic system 1200. For example, the haptic feedback may be provided when an action request is received or has been performed.

The electronic system 1200 may include a camera 1250 that may be used to take photos or videos of a user, for example, for tracking the user's eye position. The camera 1250 may also be used to take photos or videos of the environment, for example, for VR, AR, or MR applications. The camera 1250 may include, for example, a complementary metal-oxide-semiconductor (CMOS) image sensor, e.g. a silicon sensor, with a few millions or tens of millions of pixels. In some implementations, the camera 1250 may include two or more cameras that may be used to capture 3D images.

In some embodiments, the electronic system 1200 may include a plurality of other hardware modules 1280. Each of other the hardware modules 1280 may be a physical module within the electronic system 1200. While each of the other hardware modules 1280 may be permanently configured as a structure, some of other hardware modules 1280 may be temporarily configured to perform specific functions or temporarily activated. Examples of the other hardware modules 1280 may include, for example, an audio output and/or input module (e.g., a microphone or speaker), a near field communication (NFC) module, a rechargeable battery, a battery management system, a wired/wireless battery charging system, etc. In some embodiments, one or more functions of the other hardware modules 1280 may be implemented in software.

In some embodiments, the memory 1220 of the electronic system 1200 may also store the virtual reality engine 1226. The virtual reality engine 1226 may include an executable code of applications within the electronic system 1200. The virtual reality engine 1226 may receive position information, acceleration information, velocity information, predicted future positions, or some combination thereof of the HMD device from the various sensors. In some embodiments, the information received by the virtual reality engine 1226 may be used for producing a signal to the display module 1260. For example, if the received information indicates that the user has looked to the left, the virtual reality engine 1226 may generate content for the wearable display device that mirrors the user's movement in a virtual environment. Additionally, the virtual reality engine 1226 may perform an action within an application in response to an action request received from user input/output module 1270 and provide feedback to the user. The provided feedback may be visual, audible, or haptic feedback. In some implementations, the processor(s) 1210 may include one or more GPUs that may execute the virtual reality engine 1226.

The above-described hardware and modules may be implemented on a single device or on multiple devices that can communicate with one another using wired or wireless connections. For example, in some implementations, some components or modules, such as GPUs, the virtual reality engine 1226, and applications such as, for example, a headset calibration application and/or eye-tracking application, may be implemented on a console separate from the head-mounted display device. In some implementations, one console may be connected to or support more than one wearable display device.

In some implementations, different and/or additional components may be included in the electronic system 1200. Similarly, functionality of one or more of the components can be distributed among the components in a manner different from the manner described above. For example, in some embodiments, the electronic system 1200 may be modified to include other system environments, such as an AR system environment and/or an MR environment.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

The present disclosure is not to be limited in scope by the specific embodiments described herein. Indeed, other various embodiments and modifications, in addition to those described herein, will be apparent to those of ordinary skill in the art from the foregoing description and accompanying drawings. For example, embodiments may be envisioned in which the order of reflection of the input light beam from a scanning reflector and a concave reflector is changed in at least one of the first and second scanning stages. Furthermore, in some embodiments one or both of the scanning reflectors may be configured to have optical power, for example the may include a concave mirror, which may facilitate the pupil relay. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A scanning projector for a display apparatus, comprising:
   a first scanning reflector configured to steer a light beam in at least a first plane;
   a second scanning reflector configured to steer the light beam received from the first scanning reflector in at least a second plane; and,
   beam relay optics configured to relay a first pupil defined at the first scanning reflector to a second pupil defined at the second scanning reflector, and to relay the second pupil to an output pupil of the scanning projector, wherein the beam relay optics comprises a first polarization beam splitter (PBS) and a second PBS downstream of the first PBS, and wherein at least the second PBS is disposed in a triple-pass configuration.

2. The scanning projector of claim 1 wherein the second scanning reflector is configured so that the second plane is generally orthogonal to the first plane.

3. The scanning projector of claim 1 wherein the beam relay optics comprises a first concave reflector coupled to the first PBS, wherein the first PBS is disposed to route the light beam sequentially to the first scanning reflector and to the first concave reflector in a first two passes, and toward the second scanning reflector in a third pass.

4. The scanning projector of claim 3 comprising a waveplate disposed in an optical path of the light beam for converting a polarization state thereof to an orthogonal polarization state between consecutive passes through the first PBS.

5. The scanning projector of claim 3 comprising a lens disposed in an optical path of the light beam upstream of the first scanning reflector.

6. The scanning projector of claim 5 wherein the lens comprises an output lens disposed at the output pupil.

7. The scanning projector of claim 1 wherein the first PBS is disposed to direct the light beam sequentially to the first scanning reflector in a first pass and to the first concave reflector in a second pass, the beam relay optics further comprising a second concave reflector coupled to the second PBS, wherein the second PBS is disposed to direct the light beam received from the first PBS sequentially toward the second scanning reflector and toward the second concave reflector in a first two passes through the second PBS, and toward the output pupil in a third pass.

8. The scanning projector of claim 7 wherein the beam relay optics further comprises four quarter-wave plates (QWP) disposed proximate to the first scanning reflector, the second scanning reflector, the first concave reflector, and the second concave reflector, for converting a polarization of the light beam to an orthogonal polarization between consecutive passes through each of the first and second PBS.

9. The scanning projector of claim 8 wherein the first PBS is disposed to direct the light beam reflected from the first scanning reflector toward the first concave reflector, and from the first concave reflector toward the second PBS.

10. The scanning projector of claim 8 comprising a first focusing lens disposed upstream of the first PBS, and an output focusing or collimating lens disposed at the output pupil of the scanning projector upstream of the second scanning reflector.

11. The scanning projector of claim 10 wherein the first focusing lens cooperates with the first concave reflector to converge the light beam to a focus at an intermediate location in an optical path between the first and second scanning reflectors.

12. The scanning projector of claim 10 comprising a second focusing lens disposed in a double-pass configuration proximate to the second scanning reflector.

13. The scanning projector of claim 12 wherein the first concave reflector and the second focusing lens cooperate to relay the first pupil to the second pupil with a magnification.

14. The scanning projector of claim 13 wherein the second scanning reflector is greater in area than the first scanning reflector.

15. The scanning projector of claim 2 wherein each of the first and second scanning reflectors comprises a tiltable MEMS reflector.

16. A method for forming an image, the method comprising:
providing a light beam to a first scanning reflector;
responsive to a first signal, steering the light beam in at least a first plane with the first scanning reflector;
relaying the light beam from the first scanning reflector onto a second scanning reflector;
responsive to a second signal, steering the light beam with the second scanning reflector in at least a second plane; and,
relaying the light beam from the second scanning reflector to an output pupil at an angle defined by steering angles of the first and second scanning reflectors and substantially without an angle-dependent lateral spatial shift;
wherein at least one of: the relaying the light beam from the first scanning reflector onto the second scanning reflector, or the relaying the light beam from the second scanning reflector to the output pupil, comprises using a first concave reflector and a first PBS in a triple-pass configuration.

17. The method of claim 16 comprising using the first PBS and the first concave reflector to direct the light beam from the first scanning reflector to the second scanning reflector, and using a second PBS to route the light beam from the first PBS sequentially toward the second scanning reflector, and from the second scanning reflector toward the output pupil.

18. The method of claim 17 comprising changing a polarization state of the light beam to an orthogonal polarization state between consecutive passes through each of the first and second PBS.

19. A near-eye display (NED) device comprising:
a support structure for wearing on a user's head;
a light source carried by the support structure for providing a light beam;
a pupil expander carried by the support structure; and,
a scanning projector carried by the support structure, the scanning projector comprising:
a first scanning reflector configured to steer the light beam in at least a first plane;
a second scanning reflector configured to steer the light beam received from the first scanning reflector in at least a second plane; and,
beam relay optics configured to relay a first pupil defined at the first scanning reflector to a second pupil defined at the second scanning reflector, and to relay the second pupil to an output pupil of the scanning projector, the beam relay optics comprising a first polarization beam splitter (PBS) and a second PBS downstream of the first PBS, and wherein at least the second PBS is disposed in a triple-pass configuration;
wherein the pupil expander is configured to expand the output pupil of the scanning projector in size for directing the light beam toward an eye of the user.

20. The NED device of claim 19 wherein
the beam relay optics comprises
a concave reflector.

\* \* \* \* \*